United States Patent
Riemann et al.

(10) Patent No.: US 11,897,778 B2
(45) Date of Patent: Feb. 13, 2024

(54) ZEOLITE SYNTHESIS IN A REACTOR WITH CONTROLLED VELOCITY PROFILE

(71) Applicant: BASF SE, Ludwigshafen am Rhein (DE)

(72) Inventors: Christian Riemann, Ludwigshafen (DE); Andrei-Nicolae Parvulescu, Ludwigshafen (DE); Ralf Boehling, Ludwigshafen (DE); Ulrich Mueller, Ludwigshafen (DE); Hans-Juergen Luetzel, Boehl-Iggelheim (DE); Stefanie Clade, Ludwigshafen (DE); Christoph Schappert, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 169 days.

(21) Appl. No.: 16/759,491

(22) PCT Filed: Nov. 22, 2018

(86) PCT No.: PCT/EP2018/082212
§ 371 (c)(1),
(2) Date: Apr. 27, 2020

(87) PCT Pub. No.: WO2019/101854
PCT Pub. Date: May 31, 2019

(65) Prior Publication Data
US 2020/0283304 A1    Sep. 10, 2020

(30) Foreign Application Priority Data
Nov. 22, 2017    (EP) .................................... 17203017

(51) Int. Cl.
*C01B 39/02*    (2006.01)
*B01J 19/18*    (2006.01)
(Continued)

(52) U.S. Cl.
CPC .......... *C01B 39/02* (2013.01); *B01J 19/0053* (2013.01); *B01J 19/1843* (2013.01); *B01J 19/28* (2013.01);
(Continued)

(58) Field of Classification Search
None
See application file for complete search history.

(56) References Cited

U.S. PATENT DOCUMENTS 7,008,610 B2 *   3/2006   Cao .......................... C01B 37/02
                                                                     423/709
8,865,121 B2 *   10/2014  Xiao ...................... C10G 11/18
                                                                     423/709
(Continued)

FOREIGN PATENT DOCUMENTS

EP        1 504 808 A1    2/2005
KR        1399057 B1 *    5/2014
(Continued)

OTHER PUBLICATIONS

Liu, Z., et al., "widening Synthesis Bottlenecks: Realization of Ultrafast and Continuous-Flow Synthesis of High-Silica Zeolite SSZ-13 for NO, Removal", Angewandte Chem. Int. Ed., 2015, vol. 54, pp. 5683-5687.
(Continued)

*Primary Examiner* — Jennifer A Leung
(74) *Attorney, Agent, or Firm* — Lowenstein Sandler LLP

(57) ABSTRACT

The present invention relates to a process for the preparation of a zeolitic material, as well as to a catalyst per se as obtainable or obtained according to said process. Furthermore, the present invention relates to the use of the zeolitic material, in particular as a catalyst.

5 Claims, 9 Drawing Sheets

(51) Int. Cl.
*B01J 19/00* (2006.01)
*B01J 19/28* (2006.01)
*C01B 39/48* (2006.01)

(52) U.S. Cl.
CPC ..... *C01B 39/48* (2013.01); *B01J 2219/00029* (2013.01); *B01J 2219/00033* (2013.01); *B01J 2219/1943* (2013.01)

(56) References Cited

U.S. PATENT DOCUMENTS

| | | | |
|---|---|---|---|
| 2001/0054549 A1 | 12/2001 | Park et al. | |
| 2005/0197519 A1 | 9/2005 | Cao et al. | |
| 2013/0064758 A1 | 3/2013 | Yilmaz et al. | |
| 2016/0001253 A1* | 1/2016 | Hong | B01J 19/20 423/339 |
| 2016/0115039 A1 | 4/2016 | Okubo et al. | |
| 2018/0287151 A1* | 10/2018 | Hong | B01J 19/0066 |

FOREIGN PATENT DOCUMENTS

| | | |
|---|---|---|
| KR | 10-2015-0093320 A | 8/2015 |
| WO | WO 2005/063624 A1 | 7/2005 |
| WO | WO 2013/035077 A1 | 3/2013 |
| WO | WO 2013/182974 A1 | 12/2013 |

OTHER PUBLICATIONS

Ju, J., et al., "Continuous synthesis of Zeolite NaA in a microchannel Reactor", Chemical Engineering Journal, 2006, vol. 116, pp. 115-121.

Vandermeersch, T., et al., "A Continuous flow reactor setup as a tool for rapid synthesis of micron sized NaA zeolite", Microporous and Mesoporous Materials, 2016, vol. 226, pp. 133-139.

Liu, Z., et al., "Ultrafast Continuous-Flow Synthesis of Crystalline Microporous Aluminophosphate AlPO-5", Chemistry of Materials, 2014, vol. 26, pp. 2327-2331.

Slangen P.M., et al., "Continuous Synthesis of Zeolites using a Tubular Reactor", 12th International Zeolite Conference, Materials Research Society, 1999, pp. 1553-1560.

Bonaccorsi, L., et al., "Influence of process parameters in microwave continuous synthesis of Zeolite LTA", Microporous and Mesoporous Materials, 2008, vol. 112, pp. 481-493.

International Search Report dated Apr. 30, 2019 in PCT/EP2018/082212 filed on Nov. 22, 2018.

Bebon et al., "Synthesis of zeolites: study and application of a new process of homogeneous shaking out of the medium to minimize the shear rate during the crystallization", Microporous and Mesoporous Materials, Elsevier, 2002, vol. 53, No. 1-3, pp. 13-20, XP004352300.

* cited by examiner

ZEOLITE SYNTHESIS IN A REACTOR WITH CONTROLLED VELOCITY PROFILE

TECHNICAL FIELD

The present invention relates to a process for the preparation of a zeolitic material, as well as to a catalyst per se as obtainable or obtained according to said process. Furthermore, the present invention relates to the use of the zeolitic material, in particular as a catalyst.

INTRODUCTION

The synthesis of zeolitic materials from simple starting compounds involves a complex process of self organization which often necessitates special conditions such as elevated temperatures and/or pressure, wherein such reactions typically require the heating of starting materials under autogenous pressure for obtaining the zeolitic material after lengthy reaction times ranging from days to several weeks. Accordingly, due to the often harsh reaction conditions and the long reaction times, batch synthesis has long been the method of choice for synthesizing zeolitic materials. Batch reactions however present numerous limitations, in particular relative to the levels of space-time-yield which may be attained.

Efforts have accordingly been invested in finding improved batch reaction procedures as well as alternative methodologies which offer advantages to the classical batch synthetic procedures employed for the synthesis of zeolitic materials. One method which has been investigated in this respect involves the use of continuous stirred-tank reactors wherein the fluid reagents are continuously introduced at the top of a tank reactor, and the effluent containing the solid reaction product is continuously removed from the bottom of the tank reactor. Although said methodologies eliminate the need to empty the reaction vessel between batch runs under non-continuous conditions, the reaction times necessary for crystallization remain lengthy.

In view thereof, reactor geometries have been conceived which allow for a rapid synthesis of zeolitic materials. Thus, US 2016/0115039 A1 relates to a method for the continuous production of a zeolite in a tubular reactor displaying a low ratio of the volume to the lateral surface area. Similarly, Liu et al. in Angew. Chem. Int. Ed. 2015, 54, 5683-5687 discloses a continuous synthesis of high-silica zeolite SSZ-13 employing very short reaction times. Ju, J. et al. in Chemical Engineering Journal 2006, 116, 115-121 as well as Vandermeersch, T. et al. in Microporous and Mesoporous Materials 2016, 226, 133-139, on the other hand, respectively disclose the rapid synthesis of micron sized NaA zeolite in a continuous flow reactor setup. Liu, Z. et al. in Chemistry of Materials 2014, 26, 2327-2331 concerns an ultrafast continuous-flow synthesis of crystalline microporous aluminophosphate $AlPO_4$-5. Slangen et al. "Continuous Synthesis of Zeolites using a Tubular Reactor", $12^{th}$ International Zeolite Conference, Materials Research Society 1999 relates to the continuous syntheses of NaA zeolite, NaY zeolite, and silicalite-1 in a tubular reactor of 6 mm outer diameter (~3 mm inner diameter) and variable length. Bebon, C. et al. in Microporous and Mesoporous Materials 2002, 53, 13-20 concerns a method for the synthesis of zeolites employing a guide tube contained in an autoclave, wherein the reaction mixture is conveyed through the guide tube with the aid of an Archimedes screw placed within the guide tube along its axis.

For reactions which do not necessitate high pressure, microwave-assisted procedures have been investigated such as Bonaccorsi, L. et al. in Microporous and Mesoporous Materials 2008, 112, 481-493 which relates to the continuous synthesis of zeolite LTA. Similarly, US 2001/0054549 A1 concerns a continuous process and apparatus for preparing inorganic materials employing microwaves.

Although considerable progress has been made relative to the reaction efficiency in view of the use of continuous stirred-tank and multiple stage reactors, progress made in view of the reduction of the reaction times has been limited to reactor geometries applied on a lab-scale level. Furthermore, efforts made with respect to the reduction of reaction times remain highly limited with respect to economically viable durations of operation due to the clogging of the reactor, in particular due to the pronounced changes in the rheology of the reaction mixture which occur during zeolite synthesis. More specifically, upon heating in a tubular reactor with laminar flow, the synthesis gel will typically show high shear rates in the region near the wall, whereas the core will show almost no shear rate due to the slow rate of heat transfer towards the core, in part due to an insulating effect of the synthesis gel in the region near the wall. As a result, the synthesis gel displays large temperature gradients from the wall region towards the core, and large residence distribution times are observed. In view of the severe inhomogeneous treatment of the synthesis gel resulting for this situation, very long reactors would need to be employed in order to obtain degrees of crystallization which are satisfactory.

Thus, despite progress made with regard to the continuous synthesis of zeolitic materials, there remains a need for a process which avoids the problems of poor heat transfer and the ensuing inhomogeneous reaction conditions experienced by a synthesis gel in reactors.

DETAILED DESCRIPTION

It was therefore an object of the present invention to provide an improved process for preparing a zeolitic material which allows for a homogenous shear rate and temperature gradient of the synthesis gel in a reactor, in particular on an industrial scale. Thus, it has surprisingly been found that depending on whether the reaction mixture displays a shear thinning or shear thickening rheology during the crystallization process, by using a flow regimen with a specific velocity profile in a reactor, it is possible to obtain an improved homogeneity with regard to the temperature and shear rate gradient within the synthesis gel in the direction of flow. In particular, it has quite unexpectedly been found that by generating a velocity profile of the reaction mixture within the reactor which is essentially opposite to the velocity profile generated by laminar flow of the same reaction mixture through a tubular reactor, an improved homogeneity is obtained for the rate of crystallization within the reactor mixture as well as with regard to the transport rate of the mixture within the reactor such as to avoid the considerable disadvantages of inhomogeneous crystallization and mass transfer incurred in the conventional synthesis of zeoliitc materials, in particular in continuous synthesis methodologies.

Therefore, the present invention relates to a process for preparing a zeolitic material having a framework structure comprising $YO_2$ and optionally comprising $X_2O_3$, wherein Y is a tetravalent element and X is a trivalent element, said process comprising (i) preparing a mixture comprising a source of $YO_2$, optionally a source of $X_2O_3$, and a liquid solvent system;
(ii) feeding the mixture prepared in (i) as the reaction mixture into a reactor;
(iii) heating the reaction mixture in the reactor for obtaining a reacted mixture containing a zeolitic material having a framework structure comprising $YO_2$ and optionally comprising $X_2O_3$; and
(iv) collecting the reacted mixture obtained in (iii) containing the zeolitic material as the effluent from the reactor;

wherein in (iii) the reaction mixture is subject to shearing such as to create a flow of the reaction mixture relative to the outer wall of the reactor with which the reaction mixture is in contact, and wherein in (iii) in instances wherein the reaction mixture displays a shear thinning rheology (pseudoplastic rheology), the velocity profile v(r) of the reaction mixture in the direction of flow fulfills the condition according to (I):

$$v(r) \leq ((v(r_1) - v_{min}) \cdot (r/r_1)) + v_{min} \quad \text{(I)}$$

and wherein in (iii) in instances wherein the reaction mixture displays a shear thickening rheology (dilatant rheology), the velocity profile v(r) of the reaction mixture in the direction of flow fulfills the condition according to (II):

$$v(r) \geq ((v(r_1) - v_{min}) \cdot (r/r_1)) + v_{min} \quad \text{(II)}$$

wherein r defines the length of a straight line on the cross-sectional area of the reactor space perpendicular to the flow direction of the reaction mixture in the reactor, wherein said straight line extends from a first point at the inner surface of the wall of the reactor in contact with the mixture, wherein at said first point $r_0$ is defined as 0 and v exhibits its minimum value ($v_{min} = v(r_0)$), to a second point where r is defined as $r_{max}$ and v exhibits its maximum value ($v_{max} = v(r_{max})$), wherein $r_1 = r_{max}/x$, and x=5, preferably x=4, more preferably x=3, more preferably x=2.5, more preferably x=2, more preferably x=1.8, more preferably x=1.6, more preferably x=1.5, more preferably x=1.4, more preferably x=1.3, more preferably x=1.2, more preferably x=1.1, more preferably x≥1, wherein more preferably $r = r_{max}$.

The straight line r is preferably perpendicular to the inner surface of the wall of the reactor in contact with the reaction mixture.

Preferably, in (iii) in instances wherein the reaction mixture displays a shear thinning rheology (pseudoplastic rheology), the second derivative v"(r) of the velocity profile fulfills the condition according to (III):

$$v''(r) \geq 0 \quad \text{(III)}$$

and wherein in (iii) in instances wherein the reaction mixture displays a shear thickening rheology (dilatant rheology), the second derivative v"(r) of the velocity profile fulfills the condition according to (IV):

$$v''(r) \leq 0 \quad \text{(IV)}.$$

In instances wherein the reaction mixture displays a shear thinning rheology (pseudoplastic rheology), preferably the velocity profile v(r) of the reaction mixture in the direction of flow fulfills the condition according to (V):

$$v(r) < ((v(r_1) - v_{min}) \cdot (r/r_1)) + v_{min} \quad \text{(V)}$$

for $0 < r < r_{max}$, and wherein in instances wherein the reaction mixture displays a shear thickening rheology (dilatant rheology), the velocity profile v(r) of the reaction mixture in the direction of flow fulfills the condition according to (VI):

$$v(r) > ((v(r_1) - v_{min}) \cdot (r/r_1)) + v_{min} \quad \text{(VI)}$$

for $0 < r < r_{max}$.

Preferably, in (iii) in instances wherein the reaction mixture displays a shear thinning rheology (pseudoplastic rheology), the second derivative v"(r) of the velocity profile fulfills the condition according to (VII):

$$v''(r) > 0 \quad \text{(VII)}$$

for $0 < r < r_{max}$, and wherein in (iii) in instances wherein the reaction mixture displays a shear thickening rheology (dilatant rheology), the second derivative v"(r) of the velocity profile fulfills the condition according to (VIII):

$$v''(r) < 0 \quad \text{(VIII)}$$

for $0 < r < r_{max}$.

Furthermore and in addition thereto, the present invention equally relates to process for preparing a zeolitic material having a framework structure comprising $YO_2$ and optionally comprising $X_2O_3$, wherein Y is a tetravalent element and X is a trivalent element, said process comprising
(i) preparing a mixture comprising a source of $YO_2$, optionally a source of $X_2O_3$, and a liquid solvent system;
(ii) feeding the mixture prepared in (i) as the reaction mixture into a reactor;
(iii) heating the reaction mixture in the reactor for obtaining a reacted mixture containing a zeolitic material having a framework structure comprising $YO_2$ and optionally comprising $X_2O_3$; and
(iv) collecting the reacted mixture obtained in (iii) containing the zeolitic material as the effluent from the reactor;

wherein the reactor is a Taylor-Couette reactor comprising an inner cylinder and an outer cylinder which are coaxially aligned.

In (iii), preferably the flow regime in at least a portion P of the volume of the reactor is laminar, wherein the portion P is preferably an uninterrupted portion of the volume of the reactor. Preferably, in (iii) the Reynolds number (Re) in at least the portion P of the volume of the reactor containing the reaction mixture is 2,500 or less, more preferably of 2,000 or less, more preferably of 1,500 or less, more preferably of 1,000 or less, more preferably of 500 or less, more preferably of 300 or less, more preferably of 200 or less, more preferably of 100 or less, more preferably of 80 or less, more preferably of 60 or less, more preferably of 40 or less, more preferably of 20 or less, more preferably of 10 or less, more preferably of 5 or less, more preferably of 3 or less, and more preferably of 1 or less. The term Reynolds number (Re) as used herein means $Re = u_{ax} \cdot d_{gap}/n$; wherein $u_{ax}$ is the axial velocity of the liquid used, n is the dynamic viscosity and $d_{gap}$ is the gap width in the reactor, preferably the gap width between rotating cylinders in the reactor; whereby axial is in the sense of being aligned with the rotating axis of the cylinders in the reactor, wherein the reactor is preferably a Taylor-Couette reactor.

Preferably in (iii) the Taylor number (Ta), more preferably the tangential Taylor number, in at least the portion P of the volume of the reactor containing the reaction mixture fulfills the condition according to (III):

$$Ta \leq (1.52 \cdot Re) + n \quad \text{(III)}$$

wherein n≤102, preferably ≤100, more preferably ≤98, more preferably ≤95, more preferably ≤90, more preferably ≤80, more preferably ≤60, more preferably ≤40, more preferably ≤20, more preferably ≤10, more preferably ≤5, and more preferably ≤1. The term Taylor number (Ta) as used herein means $Ta=r_i \cdot u_i \cdot d_{gap}/n$, wherein n is the dynamic viscosity, ri is the radius of the inner cylinder, $u_i$ is the rotational velocity of the inner cylinder, $d_{gap}$ is the gap width in the reactor, preferably the gap width between rotating cyliders in the reactor; wherein the reactor is preferably a taylor-Couette reactor. Tangential Taylor number as used herein means the Taylor number (Ta) being further defined for the tangential flow with respect to the rotating cylinder wall of the reactor, preferably a Taylor-Couette reactor.

Preferably the uninterrupted, portion P of the volume of the reactor preferably constitutes 5 to 100% of the total volume of the reactor containing the reaction mixture, more preferably 10 to 95%, more preferably 20 to 90%, more preferably 30 to 85%, more preferably 40 to 80%, more preferably 50 to 75%, and more preferably 60 to 70% of the total volume of the reactor containing the reaction mixture.

Preferably, the reaction mixture displays a shear thinning rheology (pseudoplastic rheology) or wherein the reaction mixture displays a shear thickening rheology (dilatant rheology), wherein preferably the reaction mixture displays a shear thinning rheology (pseudoplastic rheology).

As to step (iii), the mixture is heated to a temperature preferably in the range of from 100 to 300° C., more preferably of from 120 to 280° C., more preferably of from 140 to 260° C., more preferably of from 160 to 250° C., more preferably of from 180 to 240° C., more preferably of from 190 to 230° C., and more preferably of from 200 to 220° C.

As to the reactor, the volume of the reactor containing the reaction mixture preferably is in the range of from 5 cm³ to 1 m³, more preferably from 10 cm³ to 1 m³, more preferably from 20 cm³ to 0.5 m³, more preferably from 30 cm³ to 0.1 m³, more preferably from 50 cm³ to 0.05 m³, more preferably from 80 cm³ to 0.01 m³, more preferably from 100 to 5,000 cm³, more preferably from 120 to 3,000 cm³, more preferably from 150 to 1,000 cm³, more preferably from 200 to 700 cm³, more preferably from 230 to 500 cm³, and more preferably from 250 to 300 cm³. Preferably, the inner surface of the wall of the reactor in contact with the mixture is made of a metallic material, wherein the metallic material comprises one or more metals selected from the group consisting of Ta, Cr, Fe, Ni, Cu, Al, Mo, and combinations and/or alloys of two or more thereof, more preferably from the group consisting of Ta, Cr, Fe, Ni, Mo, and combinations and/or alloys of two or more thereof, preferably from the group consisting of Cr, Fe, Ni, Mo, and combinations and/or alloys of two or more thereof wherein preferably the metallic material comprises a nickel alloy, a nickel-molybdenum alloy, and more preferably a nickel-molybdenum-chromium alloy. Preferably, the inner surface of the wall of the reactor in contact with the mixture is lined with an organic polymer material, wherein the organic polymer material more preferably comprises one or more polymers selected from the group consisting of fluorinated polyalkylenes and mixtures of two or more thereof, preferably from the group consisting of (C2-C3)polyalkylenes and mixtures of two or more thereof, preferably from the group consisting of fluorinated polyethylenes and mixtures of two or more thereof, wherein more preferably the polymer material comprises poly(tetrafluoroethylene), wherein more preferably the inner wall of the reactor is lined with poly(tetrafl uoroethylene).

As to step (iii), preferably in (iii) the reaction mixture is heated under autogenous pressure, wherein preferably the pressure is in the range of from 0.1 to 9 MPa, more preferably in the range of from 0.5 to 7 MPa, more preferably from 0.8 to 5 MPa, more preferably from 1.3 to 3 MPa, more preferably from 1.4 to 2 MPa, more preferably from 1.5 to 1.7 MPa.

The reactor preferably consists of a single stage. Preferably, no matter is added to and/or removed from the reaction mixture during its passage through the reactor in (iii), wherein more preferably no matter is added, wherein more preferably no matter is added and no matter is removed from the reaction mixture during its passage through the reactor in (iii).

Preferably, prior to (ii) the mixture prepared in (i) is aged at a temperature in the range of from 40 to 120° C., more preferably from 50 to 110° C., more preferably from 60 to 105° C., more preferably from 70 to 100° C., more preferably from 75 to 95° C., and more preferably from 80 to 90° C. Preferably, in (i) and prior to (ii) the mixture prepared in (i) is not heated to a temperature of 40° C. or greater, more preferably of 35° C. or greater, more preferably of 30° C. or greater, wherein more preferably in (i) and prior to (ii) the mixture prepared in (i) is not subject to a heating step. Preferably prior to (ii) the mixture prepared in (i) is aged for a duration ranging from 1 to 72 h, more preferably from 6 to 62 h, more preferably from 12 to 56 h, more preferably from 24 to 50 h, more preferably from 36 to 44 h, and more preferably from 38 to 42 h.

The mixture prepared in (i) is preferably directly fed into the reactor in (ii), wherein while being fed to the reactor in (ii), the mixture prepared in (i) is pre-heated, preferably to a temperature in the range of from 100 to 300° C., more preferably of from 100 to 280° C., more preferably of from 140 to 260° C., more preferably of from 160 to 250° C., more preferably of from 180 to 240° C., more preferably of from 190 to 230° C., and more preferably of from 200 to 220° C.

As to collecting of the reacted mixture in (iv), this preferably includes quenching the reacted mixture effluent exiting the reactor in (iii) with a liquid comprising one or more solvents and/or via expansion of the reacted mixture effluent. Preferably, the liquid for quenching comprises one or more solvents selected from the group consisting of polar protic solvents and mixtures thereof,
more preferably from the group consisting of n-butanol, isopropanol, propanol, ethanol, methanol, water, and mixtures thereof,
more preferably from the group consisting of ethanol, methanol, water, and mixtures thereof,
wherein more preferably the liquid comprises water, and wherein more preferably water is used as the liquid, preferably deionized water.

In the context of the present invention, the process preferably further comprises
(v) isolating the zeolitic material obtained in (iii) or (iv); and/or, preferably and,
(vi) washing the zeolitic material obtained in (iii), (iv) or (v);
and/or, preferably and,
(vii) drying the zeolitic material obtained in (iii), (iv), (v), or (vi);
and/or, preferably and,
(viii) calcining the zeolitic material obtained in (iii), (iv), (v), (vi), or (vii).

If step (v) is carried out, in (v) preferably the zeolitic material is isolated from the reacted mixture obtained from (iii) or (iv) by means of filtration, centrifugation and/or decantation methods, more preferably by means of microfiltration and/or ultrafiltration, wherein more preferably microfiltration and/or ultrafiltration is achieved by membrane filtration. The supernatant obtained from the isolation of the zeolitic material in (v), preferably is recycled to (i) and/or (ii), more preferably to (i).

If step (vii) is carried out, in (vii) preferably the zeolitic material is dried by means of microwave radiation and/or flash drying of the zeolitic material obtained in (iii), (iv), (v), or (vi).

If steps (vii) and (viii) are carried out, drying in (vii) and calcination in (viii) preferably is achieved by one or more steps of calcining the zeolitic material obtained in (iii), (iv), (v), or (vi).

If step (v) is carried out, in (v) isolating the zeolitic material preferably includes a step of spray-drying the zeolitic material obtained in (iii) or (iv),
and/or
wherein in (vii) drying of the zeolitic material includes a step of spray-drying the zeolitic material obtained in (iii), (iv), (v), or (vi).

If step (vii) is carried out, drying in (vii) is preferably effected at a temperature in the range from 50 to 220° C., more preferably from 70 to 180° C., more preferably from 80 to 150° C., more preferably from 90 to 130° C., more preferably from 100 to 125° C., and more preferably from 110 to 120° C.

If step (viii) is carried out, the calcining in (viii) is preferably effected at a temperature in the range from 300 to 800° C., more preferably from 350 to 750° C., more preferably from 400 to 725° C., more preferably from 450 to 700° C., more preferably from 500 to 675° C., and more preferably from 550 to 650° C.

Generally, it is possible that according to the process of the present invention that seed crystals are comprised therein. Preferably, the mixture prepared in (i) further comprises seed crystals, wherein the amount of seed crystals in the mixture prepared in (i) preferably ranges from 0.1 to 20 wt.-% based on 100 wt.-% of Y calculated as $YO_2$ contained in the mixture prepared in (i), more preferably from 0.3 to 10 wt.-%, more preferably from 0.5 to 5 wt.-%, more preferably from 1 to 3 wt.-%, and even more preferably from 1.5 to 2.5 wt.-% based on 100 wt.-% of Y calculated as $YO_2$ contained in the mixture prepared in (i). Preferably, the seed crystals comprise one or more zeolites having a framework structure selected from the group consisting of AEI, AFX, ANA, BEA, BEC, CAN, CHA, CDO, EMT, ERI, EUO, FAU, FER, GME, HEU, ITH, ITW, KFI, LEV, MEI, MEL, MFI, MOR, MTN, MWW, OFF, RRO, RTH, SAV, SFW, SZR, and TON, including mixed structures of two or more thereof, more preferably from the group consisting of CAN, AEI, EMT, SAV, SZR, KFI, ERI, OFF, RTH, GME, AFX, SFW, BEA, CHA, FAU, FER, HEU, LEV, MEI, MEL, MFI, MOR, and MWW, including mixed structures of two or more thereof, more preferably from the group consisting of AEI, AFX, BEA, CHA, ERI, FAU, FER, GME, LEV, MEL, MFI, MOR, and MWW, including mixed structures of two or more thereof, more preferably from the group consisting of AEI, AFX, BEA, CHA, ERI, FER, GME, MEL, MFI, MOR, and MWW, including mixed structures of two or more thereof, more preferably from the group consisting of AEI, BEA, CHA, ERI, MFI, and MWW, including mixed structures of two or more thereof, and more preferably from the group consisting of AEI, BEA, CHA, MFI, and MWW, including mixed structures of two or more thereof, wherein more preferably the seed crystals comprise one or more zeolites having the CHA and/or AEI framework structure.

Generally, it is possible that according to the process of the present invention that organotemplates are comprised therein. Preferably, the mixture prepared in (i) further comprises one or more organotemplates. The one or more organotemplates are preferably selected from the group consisting of tetraalkylammonium compounds, 1N-alkyl-3-quinuclidinol, or N,N,N-trialkyl-exo-aminonorbornane, and mixtures of two or more thereof, more preferably from the group consisting of 1-adamantyltri ($C_1$-$C_3$)alkyl-ammonium compounds, N,N,N-tri($C_1$-$C_2$)alkyl-($C_5$-$C_6$)cycloalkylammonium compounds, N,N,N-trimethyl-N-benzylammonium compounds, and mixtures of two or more thereof, more preferably from the group consisting of 1-adamantyltri ($C_1$-$C_2$)alkyl-ammonium compounds, N,N,N-tri($C_1$-$C_2$)alkyl-cyclopentylammonium compounds, N,N,N-tri($C_1$-$C_2$) alkylcyclohexylammonium compounds, and mixtures of two or more thereof, more preferably from the group consisting of 1-adamantyl-triethyl-ammonium compounds, 1-adamantyldiethyl-methylalkylammonium compounds, 1-adamantylethyl-dimethylammonium compounds, 1-adamantyltrimethylammonium compounds, N,N,N-triethyl-cyclohexylammonium compounds, N,N-diethyl-N-methyl-cyclohexylammonium compounds, N,N-dimethyl-N-ethyl-cyclohexylammonium compounds, N,N,N-trimethyl-cyclohexylammonium compounds, and mixtures of two or more thereof, wherein more preferably the one or more organotemplates comprises one or more 1-adamantyltrimethylammonium compounds and/or one or more N,N,N -trimethyl-cyclohexylammonium compounds, wherein more preferably the one or more organotemplates comprises one or more N,N,N -trimethyl-cyclohexylammonium compounds. Preferably, independently of one another the tetraalkylammonium compounds are salts, more preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more tetraalkylammonium compounds are tetraalkylammonium hydroxides and/or chlorides, and even more preferably tetraalkylammonium hydroxides.

Alternatively, the one or more organotemplates are preferably selected from the group consisting of tetraalkylphosphonium compounds, more preferably from the group consisting of tetra($C_1$-$C_6$)alkylphosphonium compounds, more preferably from the group consisting of tetra($C_1$- $C_6$)alkylphosphonium compounds, more preferably from the group consisting of tetra($C_1$-$C_4$)alkylphosphonium compounds, more preferably from the group consisting of tetra ($C_2$-$C_3$)alkylphosphonium compounds, more preferably from the group consisting of tetramethylphosphonium compounds, ethyltrimethylphosphonium compounds, diethyldimethylphosphonium compounds, methyltriethylphosphonium compounds, tetraethylphosphonium compounds, and mixtures of two or more thereof, wherein more preferably the one or more organotemplates are selected from the group consisting of tetraethylphosphonium compounds.

Preferably, the mixture prepared in (i) and heated in (iii) does not comprise one or more organotemplates.

In the context of the present invention Y may be any tetravalent element. Preferably, Y is selected from the group consisting of Si, Sn, Ti, Zr, Ge, and combinations of two or more thereof, Y more preferably being Si. Generally, according to (i), any suitable source of $YO_2$ can be used. Preferably, the source of $YO_2$ comprises one or more compounds selected from the group consisting of fumed silica, silica hydrosols, reactive amorphous solid silicas, silica gel, silicic acid, water glass, sodium metasilicate hydrate, sesquisilicate, disilicate, colloidal silica, silicic acid esters, and mixtures of two or more thereof, more preferably from the group consisting of fumed silica, silica hydrosols, reactive amorphous solid silicas, silica gel, silicic acid, colloidal silica, silicic acid esters, and mixtures of two or more thereof, more preferably from the group consisting of fumed silica, silica hydrosols, reactive amorphous solid silicas, silica gel, colloidal silica, and mixtures of two or more thereof, wherein even more preferably the source of $YO_2$ comprises fumed silica and/or colloidal silica, preferably colloidal silica.

In the context of the present invention X may be any trivalent element. Preferably, X is selected from the group consisting of Al, B, In, Ga, and combinations of two or more thereof, X more preferably being Al. Generally, according to (i), any suitable source of $X_2O_3$ can be used. Preferably, the source of $X_2O_3$ comprises one or more compounds selected from the group consisting of alumina, aluminates, aluminum salts, and mixtures of two or more thereof, more preferably from the group consisting of alumina, aluminum salts, and mixtures of two or more thereof, more preferably from the group consisting of alumina, aluminum tri($C_1$-$C_5$)alkoxide, AlO(OH), Al(OH)$_3$, aluminum halides, preferably aluminum fluoride and/or chloride and/or bromide, and more preferably aluminum fluoride and/or chloride, aluminum sulfate, aluminum phosphate, aluminum fluorosilicate, $[Al_{13}O_4(OH)_{24}(H_2O)_{12}]^{7+}$ containing salts, alkali metal aluminates, and mixtures of two or more thereof, more preferably from the group consisting of aluminum tri($C_2$-$C_4$) alkoxide, AlO(OH), Al(OH)$_3$, aluminum chloride, aluminum sulfate, aluminum phosphate, $[Al_{13}O_4(OH)_{24}(H_2O)_{12}]^{7+}$ containing salts, sodium aluminate, potassium aluminate, and mixtures of two or more thereof, more preferably from the group consisting of aluminum tri($C_2$-$C_3$)alkoxide, AlO(OH), Al(OH)$_3$, aluminum chloride, aluminum sulfate, $[Al_{13}O_4(OH)_{24}(H_2O)_{12}]^{7+}$ containing salts, sodium aluminate, and mixtures of two or more thereof, more preferably from the group consisting of aluminum tripropoxides, AlO(OH), aluminum sulfate, $[Al_{13}O_4(OH)_{24}(H_2O)_{12}]^{7+}$ containing salts, sodium aluminate, and mixtures of two or more thereof, and more preferably from the group consisting of aluminum tripropoxides, AlO(OH), Al(OH)$_3$, aluminum sulfate, sodium aluminate, and mixtures of two or more thereof.

Preferably, the mixture prepared in (i) further comprises at least one source for OH$^-$, wherein said at least one source for OH$^-$ preferably comprises a metal hydroxide, more preferably a hydroxide of an alkali metal M, more preferably sodium and/or potassium hydroxide, and more preferably sodium hydroxide.

In the mixture prepared in (i), comprising a source of $YO_2$, optionally a source of $X_2O_3$, and a liquid solvent system, the $YO_2$:$X_2O_3$ molar ratio of the mixture prepared in (i) is not subject to any specific restrictions. Preferably, the $YO_2$:$X_2O_3$ molar ratio of the mixture prepared in (i) ranges from 1 to 1,000, more preferably from 2 to 500, more preferably from 4 to 200, more preferably from 5 to 150, more preferably from 20 to 100, more preferably from 30 to 80, more preferably from 40 to 60, and even more preferably from 45 to 55.

Preferably, the liquid solvent system in the mixture prepared in (i) comprises one or more solvents, wherein the liquid solvent system preferably comprises one or more solvents selected from the group consisting of polar protic solvents and mixtures thereof, more preferably from the group consisting of n-butanol, isopropanol, propanol, ethanol, methanol, water, and mixtures thereof, more preferably from the group consisting of ethanol, methanol, water, and mixtures thereof, wherein more preferably the liquid solvent system comprises water, and wherein more preferably water is used as the liquid solvent system, preferably deionized water. Preferably, in (i) the liquid solvent system comprises water, wherein the $H_2O$:$YO_2$ molar ratio of the mixture prepared in (i) preferably ranges from 1 to 400, more preferably from 1 to 300, more preferably from 2 to 200, more preferably from 2 to 150, more preferably from 2 to 100, more preferably from 3 to 50, more preferably from 4 to 30, more preferably from 4.5 to 20, more preferably from 5 to 15, more preferably from 5.5 to 12, and even more preferably from 6 to 10.

As to step (iii), it is preferred that the zeolitic material obtained in (iii) has a framework structure selected from the group consisting of AEI, AFX, ANA, BEA, BEC, CAN, CHA, CDO, EMT, ERI, EUO, FAU, FER, GME, HEU, ITH, ITW, KFI, LEV, MEI, MEL, MFI, MOR, MTN, MWW, OFF, RRO, RTH, SAV, SFW, SZR, and TON, including mixed structures of two or more thereof, more preferably from the group consisting of CAN, AEI, EMT, SAV, SZR, KFI, ERI, OFF, RTH, GME, AFX, SFW, BEA, CHA, FAU, FER, HEU, LEV, MEI, MEL, MFI, MOR, and MWW, including mixed structures of two or more thereof, more preferably from the group consisting of BEA, CHA, FAU, FER, GME, LEV, MFI, MOR, and MWW, including mixed structures of two or more thereof, more preferably from the group consisting of BEA, CHA, GME, MFI, MOR, and MWW, including mixed structures of two or more thereof, and more preferably from the group consisting of BEA, CHA, MFI, and MWW, including mixed structures of two or more thereof, wherein more preferably the zeolitic material obtained in (iii) has the CHA and/or BEA framework structure, preferably the CHA framework structure.

Preferably, the mixture prepared in (i) and heated in (iii) consists of a single liquid phase optionally containing a solid phase. Preferably, the mixture heated in (iii) in the reactor is mechanically agitated, wherein more preferably mechanical agitation is achieved by movable parts contained in the reactor.

Generally, it is possible according to the process of the present invention that any reactor may be employed. The term "reactor" as used herein means any reactor which allows the reaction mixture to flow with a velocity profile according to the present invention, whilst allowing the reaction mixture to react and thus obtain the reacted mixture. Preferably, the reactor is a tubular reactor, more preferably the reactor is a Taylor-Couette reactor comprising an inner cylinder and an outer cylinder which are coaxially aligned, wherein the Taylor-Couette reactor preferably has a rotor-stator set-up, with the outer cylinder as the stator. Preferably, the two coaxial cylinders rotate at a speed in the range of 5 to 5,000 rpm relative to each other, more preferably of from 10 to 3,000 rpm, more preferably of from 30 to 2,500 rpm, more preferably of from 50 to 2,000 rpm, more preferably of from 100 to 1,500 rpm, more preferably of from 150 to 1,200 rpm, more preferably of from 200 to 1,000 rpm, more preferably of from 250 to 800 rpm, more preferably of from 300 to 700 rpm, more preferably of from 350 to 650 rpm, more preferably of from 400 to 600 rpm, and more preferably of from 450 to 550 rpm. Preferably, the gap between the two coaxial cylinders is in the range of from 0.3 to 50 cm, more preferably of from 0.4 to 30 cm, more preferably of from 0.5 to 25 cm, more preferably of from 0.6 to 20 cm, more preferably of from 0.6 to 15 cm, more preferably of from 0.7 to 10 cm, more preferably of from 0.7 to 5 cm, more preferably of from 0.8 to 3 cm, more preferably of from 0.8 to 2 cm, more preferably of from 0.9 to 1.5 cm, more preferably of from 0.9 to 1.2 cm, and more preferably of from 1.0 to 1.1 cm. Preferably, the diameter of the inner cylinder is in the range of from 0.5 to 100 cm, more preferably of from, 1 to 50 cm, more preferably of from 1.5 to 30 cm, more preferably of from 2 to 20 cm, more preferably of from 2.5 to 15 cm, more preferably of from 3 to 10 cm, more preferably of from 3.5 to 8 cm, more preferably of from 4 to 7 cm, more preferably of from 4.5 to 6 cm, and more preferably of from 5 to 5.5 cm. The length of the two coaxial cylinders is preferably in the range of from 5 to 500 cm, more preferably of from 8 to 300 cm, more preferably of from 10 to 200 cm, more preferably of from 12 to 150 cm, more preferably of from 15 to 100 cm, more preferably of from 18 to 80 cm, more preferably of from 20 to 50 cm, more preferably of from 23 to 35 cm, and more preferably of from 25 to 30 cm. Preferably, the inner and/or the outer cylinder, and more preferably the outer cylinder, is heated to a temperature in the range of from 120 to 310° C., preferably of from 140 to 290° C., more preferably of from 160 to 270° C., more preferably of from 180 to 260° C., more preferably of from 200 to 250° C., more preferably of from 210 to 240° C., and more preferably of from 220 to 230° C.

Generally, it is possible that the process of the present invention may be conducted in a continuous mode or in a batch mode. Preferably, the feeding of the mixture in (ii) and the collecting of the reacted mixture in (iv) are conducted in a continuous mode and/or in a batch mode, more preferably in a continuous mode. Preferably, the process is conducted in a continuous mode and/or in a batch mode, more preferably in a continuous mode. The feeding of the mixture in (ii) and the collecting of the reacted mixture in (iv) are preferably conducted in a continuous mode, and the liquid hourly space velocity is in the range of from 0.3 to 250 $h^{-1}$, more preferably from 0.5 to 150 $h^{-1}$, more preferably from 1 to 100 $h^{-1}$, more preferably from 2 to 70 $h^{-1}$, more preferably from 5 to 50 $h^{-1}$, more preferably from 8 to 30 $h^{-1}$, more preferably from 10 to 20 $h^{-1}$, and more preferably from 12 to 14 $h^{-1}$. Preferably, in (ii) the mixture is continuously fed into the reactor for a duration of at least 1 h to 10 years, more preferably for a duration ranging from 6 h to 8 years, more preferably from 12 h to 7 years, more preferably from 1 day to 6 years, more preferably from 7 days to 5 years, more preferably from 15 days to 4 years, more preferably from 1 month to 3.5 years, more preferably from 2 months to 3 years, more preferably from 4 months to 2.5 years, more preferably from 6 months to 2 years, more preferably from 8 months to 18 months, and more preferably from 10 to 14 months.

The present invention further relates to a zeolitic material having a framework structure comprising $YO_2$ and optionally comprising $X_2O_3$, wherein Y is a tetravalent element and X is a trivalent element as obtainable and/or obtained according to the process described herein above.

Depending on the intended use of the zeolitic material, the material, preferably obtained from (iv) can be employed as such. Further, it is conceivable that this zeolitic material is subjected to one or more further post-treatment steps. For example, the zeolitic material which is more preferably obtained as a powder can be suitably processed to a molding or a shaped body by any suitably method, including, but no restricted to, extruding, tableting, spraying and the like. Preferably, the shaped body may have a rectangular, a triangular, a hexagonal, a square, an oval or a circular cross section, and/or preferably is in the form of a star, a tablet, a sphere, a cylinder, a strand, or a hollow cylinder. When preparing a shaped body, one or more binders can be used which may be chosen according to the intended use of the shaped body. Possible binder materials include, but are not restricted to, graphite, silica, titania, zirconia, alumina, and a mixed oxide of two or more of silicon, titanium and zirconium. The weight ratio of the zeolitic material relative to the binder is generally not subject to any specific restrictions and may be, for example, in the range of from 10:1 to 1:10. According to a further example according to which the zeolitic material is used, for example, as a catalyst or as a catalyst component for treating an exhaust gas stream, for example an exhaust gas stream of an engine, it is possible that the zeolitic material is used as a component of a washcoat to be applied onto a suitable substrate, such as a wall-flow filter or the like.

The zeolitic material of the present invention having a framework structure comprising $YO_2$ and optionally comprising $X_2O_3$, wherein Y is a tetravalent element and X is a trivalent element can be used for any conceivable purpose, including, but not limited to, a molecular sieve, as an adsorbent, for ion-exchange, as a catalyst and/or as a catalyst support, preferably as a catalyst and/or as a catalyst support, or an intermediate for preparing one or more thereof.

The present invention is further illustrated by the following set of embodiments and combinations of embodiments resulting from the dependencies and back-references as indicated. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4".

1. A process for preparing a zeolitic material having a framework structure comprising $YO_2$ and optionally comprising $X_2O_3$, wherein Y is a tetravalent element and X is a trivalent element, said process comprising
    (i) preparing a mixture comprising a source of $YO_2$, optionally a source of $X_2O_3$, and a liquid solvent system;
    (ii) feeding the mixture prepared in (i) as the reaction mixture into a reactor;
    (iii) heating the reaction mixture in the reactor for obtaining a reacted mixture containing a zeolitic material having a framework structure comprising $YO_2$ and optionally comprising $X_2O_3$; and
    (iv) collecting the reacted mixture obtained in (iii) containing the zeolitic material as the effluent from the reactor;
wherein in (iii) the reaction mixture is subject to shearing such as to create a flow of the reaction mixture relative to the outer wall of the reactor with which the reaction mixture is in contact, and
wherein in (iii) in instances wherein the reaction mixture displays a shear thinning rheology (pseudoplastic rheology), the velocity profile v(r) of the reaction mixture in the direction of flow fulfills the condition according to (I):

$$v(r) \leq ((v(r_1) - v_{min}) \cdot (r/r_1)) + v_{min} \qquad (I)$$

and wherein in (iii) in instances wherein the reaction mixture displays a shear thickening rheology (dilatant rheology), the velocity profile v(r) of the reaction mixture in the direction of flow fulfills the condition according to (II):

$$v(r) \geq ((v(r_1) - v_{min}) \cdot (r/r_1)) + v_{min} \quad \text{(II)}$$

wherein r defines the length of a straight line on the cross-sectional area of the reactor space perpendicular to the flow direction of the reaction mixture in the reactor, wherein said straight line extends from a first point at the inner surface of the wall of the reactor in contact with the mixture, wherein at said first point $r_0$ is defined as 0 and v exhibits its minimum value ($v_{min} = v(r_0)$), to a second point where r is defined as $r_{max}$ and v exhibits its maximum value ($v_{max} = v(r_{max})$), wherein $r_1 = r_{max}/x$, and x=5, preferably x=4, more preferably x=3, more preferably x=2.5, more preferably x=2, more preferably x=1.8, more preferably x=1.6, more preferably x=1.5, more preferably x=1.4, more preferably x=1.3, more preferably x=1.2, more preferably x=1.1, more preferably x≥1, wherein more preferably $r = r_{max}$.

2. The process of embodiment 1, wherein the straight line r is perpendicular to the inner surface of the wall of the reactor in contact with the reaction mixture.

3. The process of embodiment 1 or 2, wherein in (iii) in instances wherein the reaction mixture displays a shear thinning rheology (pseudoplastic rheology), the second derivative v''(r) of the velocity profile fulfills the condition according to (III):

$$v''(r) \geq 0 \quad \text{(III)}$$

and wherein in (iii) in instances wherein the reaction mixture displays a shear thickening rheology (dilatant rheology), the second derivative v''(r) of the velocity profile fulfills the condition according to (IV):

$$v''(r) \leq 0 \quad \text{(IV)}.$$

4. The process of any of embodiments 1 to 3, wherein in instances wherein the reaction mixture displays a shear thinning rheology (pseudoplastic rheology), the velocity profile v(r) of the reaction mixture in the direction of flow fulfills the condition according to (V):

$$v(r) < ((v(r_1) \cdot v_{min}) \cdot (r/r_1)) + v_{min} \quad \text{(V)}$$

for $0 < r < r_{max}$, and wherein in instances wherein the reaction mixture displays a shear thickening rheology (dilatant rheology), the velocity profile v(r) of the reaction mixture in the direction of flow fulfills the condition according to (VI):

$$v(r) > ((v(r_1) - v_{min}) \cdot (r/r_1)) + v_{min} \quad \text{(VI)}$$

for $0 < r < r_{max}$.

5. The process of embodiment 4, wherein in (iii) in instances wherein the reaction mixture displays a shear thinning rheology (pseudoplastic rheology), the second derivative v''(r) of the velocity profile fulfills the condition according to (VII):

$$v''(r) > 0 \quad \text{(VII)}$$

for $0 < r < r_{max}$, and wherein in (iii) in instances wherein the reaction mixture displays a shear thickening rheology (dilatant rheology), the second derivative v''(r) of the velocity profile fulfills the condition according to (VIII):

$$v''(r) < 0 \quad \text{(VIII)}$$

for $0 < r < r_{max}$.

6. The process of any of embodiments 1 to 5, wherein the mixture heated in (iii) in the reactor is mechanically agitated, wherein preferably mechanical agitation is achieved by movable parts contained in the reactor.

7. The process of any of embodiments 1 to 6, wherein the reactor is a Taylor-Couette reactor comprising an inner cylinder and an outer cylinder which are coaxially aligned, wherein the Taylor-Couette reactor preferably has a rotor-stator set-up, with the outer cylinder as the stator.

8. The process of embodiment 7, wherein the two coaxial cylinders rotate at a speed in the range of 5 to 5,000 rpm relative to each other, preferably of from 10 to 3,000 rpm, more preferably of from 30 to 2,500 rpm, more preferably of from 50 to 2,000 rpm, more preferably of from 100 to 1,500 rpm, more preferably of from 150 to 1,200 rpm, more preferably of from 200 to 1,000 rpm, more preferably of from 250 to 800 rpm, more preferably of from 300 to 700 rpm, more preferably of from 350 to 650 rpm, more preferably of from 400 to 600 rpm, and more preferably of from 450 to 550 rpm.

9. The process of embodiment 7 or 8, wherein the gap between the two coaxial cylinders is in the range of from 0.3 to 50 cm, preferably of from 0.4 to 30 cm, more preferably of from 0.5 to 25 cm, more preferably of from 0.6 to 20 cm, more preferably of from 0.6 to 15 cm, more preferably of from 0.7 to 10 cm, more preferably of from 0.7 to 5 cm, more preferably of from 0.8 to 3 cm, more preferably of from 0.8 to 2 cm, more preferably of from 0.9 to 1.5 cm, more preferably of from 0.9 to 1.2 cm, and more preferably of from 1.0 to 1.1 cm.

10. The process of any of embodiments 7 to 9, wherein the diameter of the inner cylinder is in the range of from 0.5 to 100 cm, preferably of from, 1 to 50 cm, more preferably of from 1.5 to 30 cm, more preferably of from 2 to 20 cm, more preferably of from 2.5 to 15 cm, more preferably of from 3 to 10 cm, more preferably of from 3.5 to 8 cm, more preferably of from 4 to 7 cm, more preferably of from 4.5 to 6 cm, and more preferably of from 5 to 5.5 cm.

11. The process of any of embodiments 7 to 10, wherein the length of the two coaxial cylinders is in the range of from 5 to 500 cm, preferably of from 8 to 300 cm, more preferably of from 10 to 200 cm, more preferably of from 12 to 150 cm, more preferably of from 15 to 100 cm, more preferably of from 18 to 80 cm, more preferably of from 20 to 50 cm, more preferably of from 23 to 35 cm, and more preferably of from 25 to 30 cm.

12. The process of any of embodiments 7 to 11, wherein the inner and/or the outer cylinder, and preferably the outer cylinder, is heated to a temperature in the range of from 120 to 310° C., preferably of from 140 to 290° C., more preferably of from 160 to 270° C., more preferably of from 180 to 260° C., more preferably of from 200 to 250° C., more preferably of from 210 to 240° C., and more preferably of from 220 to 230° C.

13. A process for preparing a zeolitic material having a framework structure comprising $YO_2$ and optionally comprising $X_2O_3$, wherein Y is a tetravalent element and X is a trivalent element, said process comprising
 (i) preparing a mixture comprising a source of $YO_2$, optionally a source of $X_2O_3$, and a liquid solvent system;
 (ii) feeding the mixture prepared in (i) as the reaction mixture into a reactor;
 (iii) heating the reaction mixture in the reactor for obtaining a reacted mixture containing a zeolitic material having a framework structure comprising $YO_2$ and optionally comprising $X_2O_3$; and
 (iv) collecting the reacted mixture obtained in (iii) containing the zeolitic material as the effluent from the reactor;
wherein the reactor is a Taylor-Couette reactor comprising an inner cylinder and an outer cylinder which are coaxially aligned.

14. The process of embodiment 13, wherein the Taylor-Couette reactor has a rotor-stator setup, with the outer cylinder as the stator.

15. The process of embodiment 13 or 14, wherein the two coaxial cylinders rotate at a speed in the range of 5 to 5,000 rpm relative to each other, preferably of from 10 to 3,000 rpm, more preferably of from 30 to 2,500 rpm, more preferably of from 50 to 2,000 rpm, more preferably of from 100 to 1,500 rpm, more preferably of from 150 to 1,200 rpm, more preferably of from 200 to 1,000 rpm, more preferably of from 250 to 800 rpm, more preferably of from 300 to 700 rpm, more preferably of from 350 to 650 rpm, more preferably of from 400 to 600 rpm, and more preferably of from 450 to 550 rpm.

16. The process of any of embodiments 13 to 15, wherein the gap between the two coaxial cylinders is in the range of from 0.3 to 50 cm, preferably of from 0.4 to 30 cm, more preferably of from 0.5 to 25 cm, more preferably of from 0.6 to 20 cm, more preferably of from 0.6 to 15 cm, more preferably of from 0.7 to 10 cm, more preferably of from 0.7 to 5 cm, more preferably of from 0.8 to 3 cm, more preferably of from 0.8 to 2 cm, more preferably of from 0.9 to 1.5 cm, more preferably of from 0.9 to 1.2 cm, and more preferably of from 1.0 to 1.1 cm.

17. The process of any of embodiments 13 to 16, wherein the diameter of the inner cylinder is in the range of from 0.5 to 100 cm, preferably of from, 1 to 50 cm, more preferably of from 1.5 to 30 cm, more preferably of from 2 to 20 cm, more preferably of from 2.5 to 15 cm, more preferably of from 3 to 10 cm, more preferably of from 3.5 to 8 cm, more preferably of from 4 to 7 cm, more preferably of from 4.5 to 6 cm, and more preferably of from 5 to 5.5 cm.

18. The process of any of embodiments 13 to 17, wherein the length of the two coaxial cylinders is in the range of from 5 to 500 cm, preferably of from 8 to 300 cm, more preferably of from 10 to 200 cm, more preferably of from 12 to 150 cm, more preferably of from 15 to 100 cm, more preferably of from 18 to 80 cm, more preferably of from 20 to 50 cm, more preferably of from 23 to 35 cm, and more preferably of from 25 to 30 cm.

19. The process of any of embodiments 13 to 18, wherein the inner and/or the outer cylinder, and preferably the outer cylinder, is heated to a temperature in the range of from 120 to 310° C., preferably of from 140 to 290° C., more preferably of from 160 to 270° C., more preferably of from 180 to 260° C., more preferably of from 200 to 250° C., more preferably of from 210 to 240° C., and more preferably of from 220 to 230° C.

20. The process of any of embodiments 1 to 19, wherein in (iii) the flow regime in at least a portion P of the volume of the reactor is laminar, wherein the portion P is preferably an uninterrupted portion of the volume of the reactor.

21. The process of any of embodiments 1 to 20, wherein in (iii) the Reynolds number (Re) in at least the portion P of the volume of the reactor containing the reaction mixture is 2,500 or less, preferably of 2,000 or less, more preferably of 1,500 or less, more preferably of 1,000 or less, more preferably of 500 or less, more preferably of 300 or less, more preferably of 200 or less, more preferably of 100 or less, more preferably of 80 or less, more preferably of 60 or less, more preferably of 40 or less, more preferably of 20 or less, more preferably of 10 or less, more preferably of 5 or less, more preferably of 3 or less, and more preferably of 1 or less.

22. The process of embodiment 21, wherein in (iii) the Taylor number (Ta), preferably the tangential Taylor number, in at least the portion P of the volume of the reactor containing the reaction mixture fulfills the condition according to (III):

$$Ta \leq (1.52 \cdot Re) + n \quad \text{(III)}$$

wherein $n \leq 102$, preferably $\leq 100$, more preferably $\leq 98$, more preferably $\leq 95$, more preferably $\leq 90$, more preferably $\leq 80$, more preferably $\leq 60$, more preferably $\leq 40$, more preferably $\leq 20$, more preferably $\leq 10$, more preferably $\leq 5$, and more preferably $\leq 1$.

23. The process of any of embodiments 20 to 22, wherein the, preferably uninterrupted, portion P of the volume of the reactor constitutes 5 to 100% of the total volume of the reactor containing the reaction mixture, preferably 10 to 95%, more preferably 20 to 90%, more preferably 30 to 85%, more preferably 40 to 80%, more preferably 50 to 75%, and more preferably 60 to 70% of the total volume of the reactor containing the reaction mixture.

24. The process of any of embodiments 1 to 23, wherein the reaction mixture displays a shear thinning rheology (pseudoplastic rheology) or wherein the reaction mixture displays a shear thickening rheology (dilatant rheology), wherein preferably the reaction mixture displays a shear thinning rheology (pseudoplastic rheology).

25. The process of any of embodiments 1 to 24, wherein the reaction mixture is heated to a temperature in the range of from 100 to 300° C., preferably of from 120 to 280° C., more preferably of from 140 to 260° C., more preferably of from 160 to 250° C., more preferably of from 180 to 240° C., more preferably of from 190 to 230° C., and more preferably of from 200 to 220° C.

26. The process of any of embodiments 1 to 25, wherein the volume of the reactor containing the reaction mixture is in the range of from 5 cm$^3$ to 1 m$^3$, more preferably from 10 cm$^3$ to 1 m$^3$, more preferably from 20 cm$^3$ to 0.5 m$^3$, more preferably from 30 cm$^3$ to 0.1 m$^3$, more preferably from 50 cm$^3$ to 0.05 m$^3$, more preferably from 80 cm$^3$ to 0.01 m$^3$, more preferably from 100 to 5,000 cm$^3$, more preferably from 120 to 3,000 cm$^3$, more preferably from 150 to 1,000 cm$^3$, more preferably from 200 to 700 cm$^3$, more preferably from 230 to 500 cm$^3$, and more preferably from 250 to 300 cm$^3$.

27. The process of any of embodiments 1 to 26, wherein the inner surface of the wall of the reactor in contact with the mixture is made of a metallic material, wherein the metallic material comprises one or more metals selected from the group consisting of Ta, Cr, Fe, Ni, Cu, Al, Mo, and combinations and/or alloys of two or more thereof, preferably from the group consisting of Ta, Cr, Fe, Ni, Mo, and combinations and/or alloys of two or more thereof, preferably from the group consisting of Cr, Fe, Ni, Mo, and combinations and/or alloys of two or more thereof wherein preferably the metallic material comprises a nickel alloy, a nickel-molybdenum alloy, and more preferably a nickel-molybdenum-chromium alloy.

28. The process of any of embodiments 1 to 27, wherein the inner surface of the wall of the reactor in contact with the mixture is lined with an organic polymer material, wherein the organic polymer material preferably comprises one or more polymers selected from the group consisting of fluorinated polyalkylenes and mixtures of two or more thereof, preferably from the group consisting of (C2-C3)polyalkylenes and mixtures of two or more thereof, preferably from the group consisting of fluorinated polyethylenes and mixtures of two or more thereof, wherein more preferably the polymer material comprises poly(tetrafluoroethylene), wherein more preferably the inner wall of the reactor is lined with poly(tetrafluoroethylene).

29. The process of any of embodiments 1 to 28, wherein in (iii) the reaction mixture is heated under autogenous pressure, wherein preferably the pressure is in the range of from 0.1 to 9 MPa, more preferably in the range of from 0.5 to 7 MPa, more preferably from 0.8 to 5 MPa, more preferably from 1.3 to 3 MPa, more preferably from 1.4 to 2 MPa, more preferably from 1.5 to 1.7 MPa, 30. The process of any of embodiments 1 to 29, wherein the reactor consists of a single stage.

31. The process of any of embodiments 1 to 30, wherein no matter is added to and/or removed from the reaction mixture during its passage through the reactor in (iii), wherein preferably no matter is added, wherein more preferably no matter is added and no matter is removed from the reaction mixture during its passage through the reactor in (iii).

32. The process of any of embodiments 1 to 31, wherein prior to (ii) the mixture prepared in (i) is aged at a temperature in the range of from 40 to 120° C., preferably from 50 to 110° C., more preferably from 60 to 105° C., more preferably from 70 to 100° C., more preferably from 75 to 95° C., and more preferably from 80 to 90° C.

33. The process of any of embodiments 1 to 32, wherein in (i) and prior to (ii) the mixture prepared in (i) is not heated to a temperature of 40° C. or greater, preferably of 35° C. or greater, more preferably of 30° C. or greater, wherein more preferably in (i) and prior to (ii) the mixture prepared in (i) is not subject to a heating step.

34. The process of any of embodiments 1 to 33, wherein prior to (ii) the mixture prepared in (i) is aged for a duration ranging from 1 to 72 h, preferably from 6 to 62 h, more preferably from 12 to 56 h, more preferably from 24 to 50 h, more preferably from 36 to 44 h, and more preferably from 38 to 42 h.

35. The process of any of embodiments 1 to 34, wherein the mixture prepared in (i) is directly fed into the reactor in (ii), wherein while being fed to the reactor in (ii), the mixture prepared in (i) is pre-heated, preferably to a temperature in the range of from 100 to 300° C., more preferably of from 100 to 280° C., more preferably of from 140 to 260° C., more preferably of from 160 to 250° C., more preferably of from 180 to 240° C., more preferably of from 190 to 230° C., and more preferably of from 200 to 220° C.

36. The process of any of embodiments 1 to 35, wherein the collecting of the reacted mixture in (iv) includes quenching the reacted mixture effluent exiting the reactor in (iii) with a liquid comprising one or more solvents and/or via expansion of the reacted mixture effluent.

37. The process of embodiment 36, wherein the liquid for quenching comprises one or more solvents selected from the group consisting of polar protic solvents and mixtures thereof, preferably from the group consisting of n-butanol, isopropanol, propanol, ethanol, methanol, water, and mixtures thereof,
more preferably from the group consisting of ethanol, methanol, water, and mixtures thereof,
wherein more preferably the liquid comprises water, and wherein more preferably water is used as the liquid, preferably deionized water.

38. The process of any of embodiments 1 to 37, wherein the process further comprises
(v) isolating the zeolitic material obtained in (iii) or (iv); and/or,
(vi) preferably washing the zeolitic material obtained in (iii), (iv) or (v);
and/or,
(vii) preferably drying the zeolitic material obtained in (iii), (iv), (v), or (vi);
and/or,
(viii) preferably calcining the zeolitic material obtained in (iii), (iv), (v), (vi), or (vii).

39. The process of embodiment 38, wherein in (v) the zeolitic material is isolated from the reacted mixture obtained (iii) or (iv) by means of filtration, centrifugation and/or decantation methods, preferably by means of microfiltration and/or ultrafiltration, wherein more preferably microfiltration and/or ultrafiltration is achieved by membrane filtration.

40. The process of embodiment 39, wherein the supernatant obtained from the isolation of the zeolitic material in (v), is recycled to (i) and/or (ii), preferably to (i).

41. The process of any of embodiments 38 to 40, wherein in (vii) the zeolitic material is dried by means of microwave radiation and/or flash drying of the zeolitic material obtained in (iii), (iv), (v), or (vi).

42. The process of any of embodiments 38 to 41, wherein drying in (vii) and calcination in (viii) is achieved by one or more steps of calcining the zeolitic material obtained in (iii), (iv), (v), or (vi).

43. The process of embodiment 38, wherein in (v) isolating the zeolitic material includes a step of spray-drying the zeolitic material obtained in (iii) or (iv),
and/or
wherein in (vii) drying of the zeolitic material includes a step of spray-drying the zeolitic material obtained in (iii), (iv), (v), or (vi).

44. The process of any of embodiments 38 to 43, wherein drying in (vii) is effected at a temperature in the range from 50 to 220° C., preferably from 70 to 180° C., more preferably from 80 to 150° C., more preferably from 90 to 130° C., more preferably from 100 to 125° C., and more preferably from 110 to 120° C.

45. The process of any of embodiments 38 to 44, wherein the calcining in (viii) is effected at a temperature in the range from 300 to 800° C., preferably from 350 to 750° C., more preferably from 400 to 725° C., more preferably from 450 to 700° C., more preferably from 500 to 675° C., and more preferably from 550 to 650° C.

46. The process of any of embodiments 1 to 45, wherein the mixture prepared in (i) further comprises seed crystals, wherein the amount of seed crystals in the mixture prepared in (i) preferably ranges from 0.1 to 20 wt.-% based on 100 wt.-% of Y calculated as $YO_2$ contained in the mixture prepared in (i), preferably from 0.3 to 10 wt.-%, more preferably from 0.5 to 5 wt.-%, more preferably from 1 to 3 wt.-%, and even more preferably from 1.5 to 2.5 wt.-% based on 100 wt.-% of Y calculated as $YO_2$ contained in the mixture prepared in (i).

47. The process of embodiment 46, wherein the seed crystals comprise one or more zeolites having a framework structure selected from the group consisting of AEI, AFX, ANA, BEA, BEC, CAN, CHA, CDO, EMT, ERI, EUO, FAU, FER, GME, HEU, ITH, ITW, KFI, LEV, MEI, MEL, MFI, MOR, MTN, MWW, OFF, RRO, RTH, SAV, SFW, SZR, and TON, including mixed structures of two or more thereof, preferably from the group consisting of CAN, AEI, EMT, SAV, SZR, KFI, ERI, OFF, RTH, GME, AFX, SFW, BEA, CHA, FAU, FER, HEU, LEV, MEI, MEL, MFI, MOR, and MWW, including mixed structures of two or more thereof, more preferably from the group consisting of AEI, AFX, BEA, CHA, ERI, FAU, FER, GME, LEV, MEL, MFI, MOR, and MWW, including mixed structures of two or more thereof, more preferably from the group consisting of AEI, AFX, BEA, CHA, ERI, FER, GME, MEL, MFI, MOR, and MWW, including mixed structures of two or more thereof, more preferably from the group consisting of AEI, BEA, CHA, ERI, MFI, and MWW, including mixed structures of two or more thereof, and more preferably from the group consisting of AEI, BEA, CHA, MFI, and MWW, including mixed structures of two or more thereof, wherein more preferably the seed crystals comprise one or more zeolites having the CHA and/or AEI framework structure.

48. The process of any of embodiments 1 to 47, wherein the mixture prepared in (i) further comprises one or more organotemplates.

49. The process of embodiment 48, wherein the one or more organotemplates are selected from the group consisting of tetraalkylammonium compounds, 1N-alkyl-3-quinuclidinol, or N,N,N-trialkyl-exo-aminonorbornane, and mixtures of two or more thereof, preferably from the group consisting of 1-adamantyltri($C_1$-$C_3$)alkyl-ammonium compounds, N,N,N-tri($C_1$-$C_2$)alkyl-($C_5$-$C_6$)cycloalkylammonium compounds, N,N,N-trimethyl-N-benzylammonium compounds, and mixtures of two or more thereof, more preferably from the group consisting of 1-adamantyltri($C_1$-$C_2$)alkyl-ammonium compounds, N,N,N-tri($C_1$-$C_2$)alkyl-cyclopentylammonium compounds, N,N,N-tri($C_1$-$C_2$)alkyl-cyclohexylammonium compounds, and mixtures of two or more thereof, more preferably from the group consisting of 1-adamantyltriethylammonium compounds, 1-adamantyldiethyl-methylalkylammonium compounds, 1-adamantylethyl-dimethylammonium compounds, 1-adamantyltrimethylammonium compounds, N,N,N-triethyl-cyclohexylammonium compounds, N,N-diethyl-N -methyl-cyclohexylammonium compounds, N,N-dimethyl-N -ethyl-cyclohexylammonium compounds, N,N,N -trimethyl-cyclohexylammonium compounds, and mixtures of two or more thereof, wherein more preferably the one or more organotemplates comprises one or more 1-adamantyltrimethylammonium compounds and/or one or more N,N,N -trimethyl-cyclohexylammonium compounds, wherein more preferably the one or more organotemplates comprises one or more N,N,N-trimethyl-cyclohexylammonium compounds.

50. The process of embodiment 48, wherein the one or more organotemplates are selected from the group consisting of tetraalkylphosphonium compounds, more preferably from the group consisting of tetra($C_1$-$C_6$)alkylphosphonium coampounds, more preferably from the group consisting of tetra($C_1$-$C_5$)alkylphosphonium compounds, more preferably from the group consisting of tetra($C_1$-$C_4$)alkylphosphonium compounds, more preferably from the group consisting of tetra($C_2$-$C_3$)alkylphosphonium compounds,more preferably from the group consisting of tetramethylphosphonium compounds, ethyltrimethylphosphonium compounds, diethyldimethylphosphonium compounds, methyltriethylphosphonium compounds, tetraethylphosphonium compounds, and mixtures of two or more thereof, wherein more preferably the one or more organotemplates are selected from the group consisting of tetraethylphosphonium compounds.

51. The process of embodiment 49 or 50, wherein independently of one or more organotemplates are salts, preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more tetraalkylammonium compounds are tetraalkylammonium hydroxides and/or chlorides, and even more preferably tetraalkylammonium hydroxides.

52. The process of any of embodiments 1 to 47, wherein the mixture prepared in (i) and heated in (iii) does not comprise one or more organotemplates.

53. The process of any of embodiments 1 to 52, wherein Y is selected from the group consisting of Si, Sn, Ti, Zr, Ge, and combinations of two or more thereof, Y preferably being Si.

54. The process of any of embodiments 1 to 53, wherein the source of $YO_2$ comprises one or more compounds selected from the group consisting of fumed silica, silica hydrosols, reactive amorphous solid silicas, silica gel, silicic acid, water glass, sodium metasilicate hydrate, sesquisilicate, disilicate, colloidal silica, silicic acid esters, and mixtures of two or more thereof, preferably from the group consisting of fumed silica, silica hydrosols, reactive amorphous solid silicas, silica gel, silicic acid, colloidal silica, silicic acid esters, and mixtures of two or more thereof, more preferably from the group consisting of fumed silica, silica hydrosols, reactive amorphous solid silicas, silica gel, colloidal silica, and mixtures of two or more thereof, wherein even more preferably the source of $YO_2$ comprises fumed silica and/or colloidal silica, preferably colloidal silica.

55. The process of any of embodiments 1 to 54, wherein X is selected from the group consisting of Al, B, In, Ga, and combinations of two or more thereof, X preferably being Al.

56. The process of any of embodiments 1 to 55, wherein the source of $X_2O_3$ comprises one or more compounds selected from the group consisting of alumina, aluminates, aluminum salts, and mixtures of two or more thereof, preferably from the group consisting of alumina, aluminum salts, and mixtures of two or more thereof, more preferably from the group consisting of alumina, aluminum tri($C_1$-$C_5$) alkoxide, AlO(OH), Al(OH)$_3$, aluminum halides, preferably aluminum fluoride and/or chloride and/or bromide, and more preferably aluminum fluoride and/or chloride, aluminum sulfate, aluminum phosphate, aluminum fluorosilicate, $[Al_{13}O_4(OH)_{24}(H_2O)_{12}]^{7+}$ containing salts, alkali metal aluminates, and mixtures of two or more thereof, more preferably from the group consisting of aluminum tri($C_2$-$C_4$) alkoxide, AlO(OH), Al(OH)$_3$, aluminum chloride, aluminum sulfate, aluminum phosphate, $[Al_{13}O_4(OH)_{24}(H_2O)_{12}]^{7+}$ containing salts, sodium aluminate, potassium aluminate, and mixtures of two or more thereof, more preferably from the group consisting of aluminum tri($C_2$-$C_3$)alkoxide, AlO(OH), Al(OH)$_3$, aluminum chloride, aluminum sulfate, $[Al_{13}O_4(OH)_{24}(H_2O)_{12}]^{7+}$ containing salts, sodium aluminate, and mixtures of two or more thereof, more preferably from the group consisting of aluminum tripropoxides, AlO(OH), aluminum sulfate, $[Al_{13}O_4(OH)_{24}(H_2O)_{12}]^{7+}$ containing salts, sodium aluminate, and mixtures of two or more thereof, and more preferably from the group consisting of aluminum tripropoxides, AlO(OH), Al(OH)$_3$, aluminum sulfate, sodium aluminate, and mixtures of two or more thereof.

57. The process of any of embodiments 1 to 56, wherein the mixture prepared in (i) further comprises at least one source for OH$^-$, wherein said at least one source for OH$^-$ preferably comprises a metal hydroxide, more preferably a hydroxide of an alkali metal M, more preferably sodium and/or potassium hydroxide, and more preferably sodium hydroxide.

58. The process of any of embodiments 1 to 57, wherein the $YO_2$:$X_2O_3$ molar ratio of the mixture prepared in (i)

ranges from 1 to 1,000, preferably from 2 to 500, more preferably from 4 to 200, more preferably from 5 to 150, more preferably from 20 to 100, more preferably from 30 to 80, more preferably from 40 to 60, and even more preferably from 45 to 55.

59. The process of any of embodiments 1 to 58, wherein the liquid solvent system in the mixture prepared in (i) comprises one or more solvents, wherein the liquid solvent system preferably comprises one or more solvents selected from the group consisting of polar protic solvents and mixtures thereof,
preferably from the group consisting of n-butanol, isopropanol, propanol, ethanol, methanol, water, and mixtures thereof,
more preferably from the group consisting of ethanol, methanol, water, and mixtures thereof,
wherein more preferably the liquid solvent system comprises water, and wherein more preferably water is used as the liquid solvent system, preferably deionized water.

60. The process of any of embodiments 1 to 59, wherein in (i) the liquid solvent system comprises water, wherein the $H_2O:YO_2$ molar ratio of the mixture prepared in (i) preferably ranges from 1 to 400, more preferably from 1 to 300, more preferably from 2 to 200, more preferably from 2 to 150, more preferably from 2 to 100, more preferably from 3 to 50, more preferably from 4 to 30, more preferably from 4.5 to 20, more preferably from 5 to 15, more preferably from 5.5 to 12, and even more preferably from 6 to 10.

61. The process of any of embodiments 1 to 60, wherein the zeolitic material obtained in (iii) has a framework structure selected from the group consisting of AEI, AFX, ANA, BEA, BEC, CAN, CHA, CDO, EMT, ERI, EUO, FAU, FER, GME, HEU, ITH, ITW, KFI, LEV, MEI, MEL, MFI, MOR, MTN, MWW, OFF, RRO, RTH, SAV, SFW, SZR, and TON, including mixed structures of two or more thereof, preferably from the group consisting of CAN, AEI, EMT, SAV, SZR, KFI, ERI, OFF, RTH, GME, AFX, SFW, BEA, CHA, FAU, FER, HEU, LEV, MEI, MEL, MFI, MOR, and MWW, including mixed structures of two or more thereof, more preferably from the group consisting of BEA, CHA, FAU, FER, GME, LEV, MFI, MOR, and MWW, including mixed structures of two or more thereof, more preferably from the group consisting of BEA, CHA, GME, MFI, MOR, and MWW, including mixed structures of two or more thereof, and more preferably from the group consisting of BEA, CHA, MFI, and MWW, including mixed structures of two or more thereof, wherein more preferably the zeolitic material obtained in (iii) has the CHA and/or BEA framework structure, preferably the CHA framework structure.

62. The process of any of embodiments 1 to 61, wherein the mixture prepared in (i) and heated in (iii) consists of a single liquid phase optionally containing a solid phase.

63. The process of any of embodiments 1 to 62, wherein the feeding of the mixture in (ii) and the collecting of the reacted mixture in (iv) are conducted in a continuous mode and/or in a batch mode, preferably in a continuous mode.

64. The process of any of embodiments 1 to 63, wherein the process is conducted in a continuous mode and/or in a batch mode, preferably in a continuous mode.

65. The process of any of embodiments 1 to 64, wherein the feeding of the mixture in (ii) and the collecting of the reacted mixture in (iv) are conducted in a continuous mode, and the liquid hourly space velocity is in the range of from 0.3 to 250 $h^{-1}$, preferably from 0.5 to 150 $h^{-1}$, more preferably from 1 to 100$h^{-1}$, more preferably from 2 to 70 $h^{-1}$, more preferably from 5 to 50 $h^{-1}$, more preferably from 8 to 30 $h^{-1}$, more preferably from 10 to 20 $h^{-1}$, and more preferably from 12 to 14 $h^{-1}$.

66. The process of any of embodiments 63 to 65, wherein in (ii) the mixture is continuously fed into the reactor for a duration of at least 1 h to 10 years, and preferably for a duration ranging from 6 h to 8 years, more preferably from 12 h to 7 years, more preferably from 1 day to 6 years, more preferably from 7 days to 5 years, more preferably from 15 days to 4 years, more preferably from 1 month to 3.5 years, more preferably from 2 months to 3 years, more preferably from 4 months to 2.5 years, more preferably from 6 months to 2 years, more preferably from 8 months to 18 months, and more preferably from 10 to 14 months.

67. A zeolitic material as obtainable and/or obtained according to the process of any of embodiments 1 to 66.

68. Use of a zeolitic material according to embodiment 67 as a molecular sieve, as an adsorbent, for ion-exchange, as a catalyst and/or as a catalyst support, preferably as a catalyst and/or as a catalyst support.

EXPERIMENTAL SECTION

Figure 1:
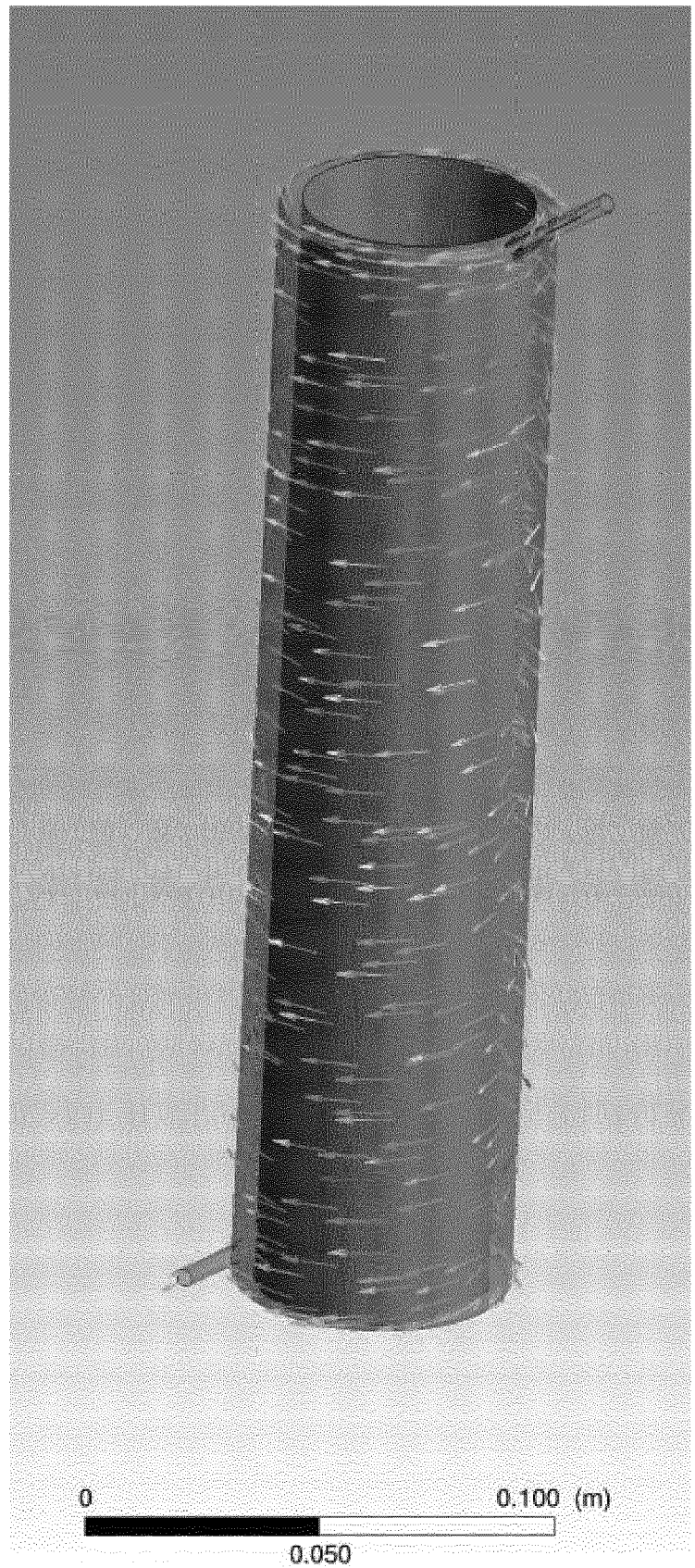
FIG. 1 displays the general set-up of the Taylor-Couette reactor wherein the inlet for the reaction mixture is depicted at the upper right portion of the reactor and the outlet is depicted at the lower left portion of the reactor. In the figure, the arrows describe the incremental direction of flow of the reaction mixture in the gap between the inner rotor of the reactor depicted as a hollow tube, and the outer mantel (stator) depicted as a transparent shell for displaying the reactor volume between rotor and stator. The scale at the bottom of the figure displays the dimensions of the reactor used for the simulation in meters.
Figure 2:
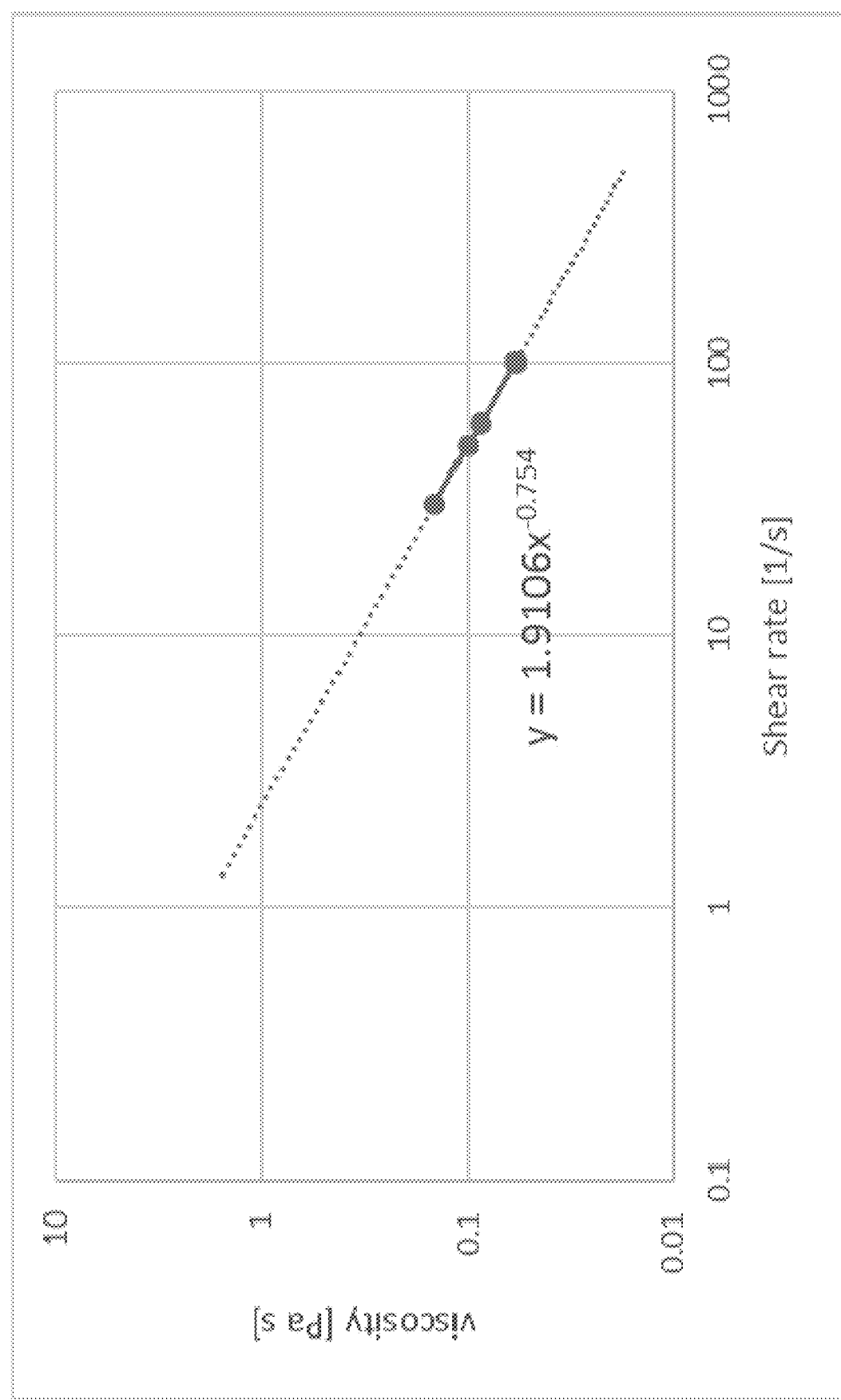
FIG. 2 displays the rheology of the reaction mixture used in for the simulation in the experimental section, wherein the viscosity in Pa·s is plotted along the abscissa, and the shear rate in $s^{-1}$ is plotted along the ordinate. In the figure, the function of the viscosity behavior in dependence on the shear rate is shown.

The experiments described herein were conducted with the simulation program Ansys® Fluent® v17.0.0. The simulations were based on a Taylor-Couette reactor set-up as shown in FIG. 1 with an inner rotor and outer stator, wherein the reaction mixture was introduced at one end of the reactor (upper right of the reactor in FIG. 1) and was allowed to flow concentrically around the rotor within the reactor volume, and to spiral down to the reactor oulet (lower left or the reactor in FIG. 1). The parameters used for the simulation are as follows:
Cylinder Geometry:
Length=25 cm
$D_{inner}$=5 cm
$D_{outer}$=6 cm
Volume=0.00027 m$^3$, Area=0.09 m$^2$
Target Reaction Time:
Tau=5 min (300 s)
Feed=0.6 g/s (36 ml/min)
Temperatures:
Wall 500 K (227° C.)
Feed 300 K (27° C.)
Pressure Drop: 1550 Pa
Material Properties (Non-Newtonian Behaviour):
Consistency Index 1.1
Power-Law Index 0.252
The viscosity characteristics of the reaction mixture used in the simulations is displayed in FIG. 2.

Example 1: Simulation with Low Taylor Number

Figure 3:
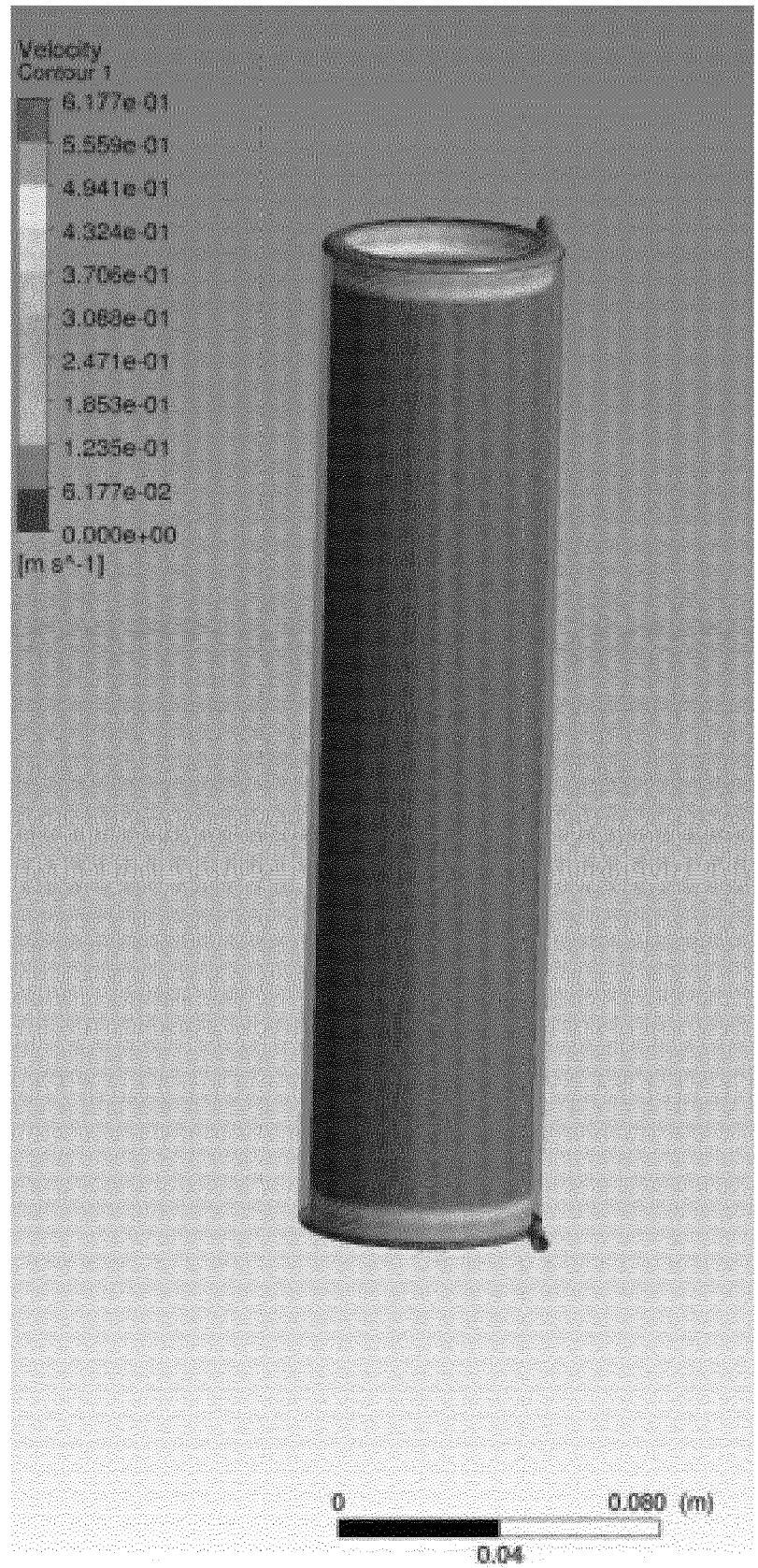
FIG. 3 displays the velocity contour of the reaction mixture in the Taylor-Couette reactor for the simulation of Example 1, wherein the scale in the figure indicates the velocity in m·$s^{-1}$, which ranges from 0 to 0.6177 m·$s^{-1}$. The scale at the bottom of the figure displays the dimensions of the reactor used for the simulation in meters.
Figure 4:
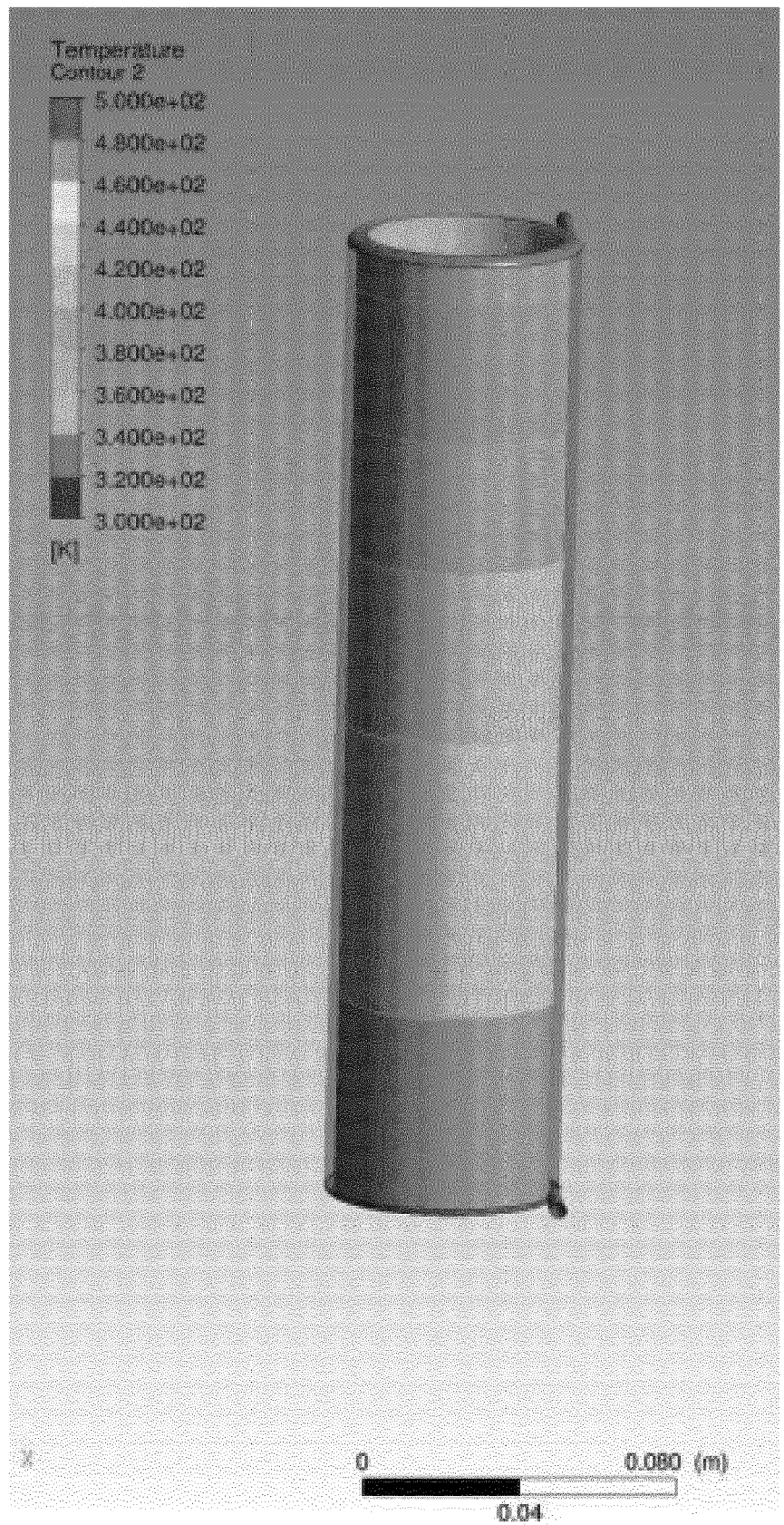
FIGS. 4, 6, and 8 display the temperature contour of the reaction mixture in the Taylor-Couette reactor for the simulation of Examples 1, 2, and 3, respectively, wherein the scale in the figure indicates the temperature in degrees kelvin (K), which ranges from 300 to 500 K. The scale at the bottom of the figure displays the dimensions of the reactor used for the simulation in meters.

A simulation was conducted with the reaction set-up described above, wherein the shear rate of the Taylor-Couette reactor was set such that the Reynolds number (Re) of the reaction mixture was Re=2.3, and the Taylor number (Ta) of the reaction mixture was Ta=1. The velocity contour obtained according to the simulation is displayed in FIG. 3, and the temperature contour is shown in FIG. 4. Thus, as may be taken from the results of the simulation displayed in FIG. 3, under the conditions chosen the reaction mixture displays a substantially homogenous velocity profile along the entire length of the reactor volume, with values around 0.6 m·s$^{-1}$, which indicative of a laminar flow regime of the reaction mixture substantially along the entire length of the reactor. As may be taken from the temperature contour displayed in FIG. 4, the reaction mixture displays a gradual increase in temperature from the upper inlet region displaying temperature values of around 350 K to the lower outlet region displaying values of around 460 K.

Example 2: Simulation with High Taylor Number

Figure 5:
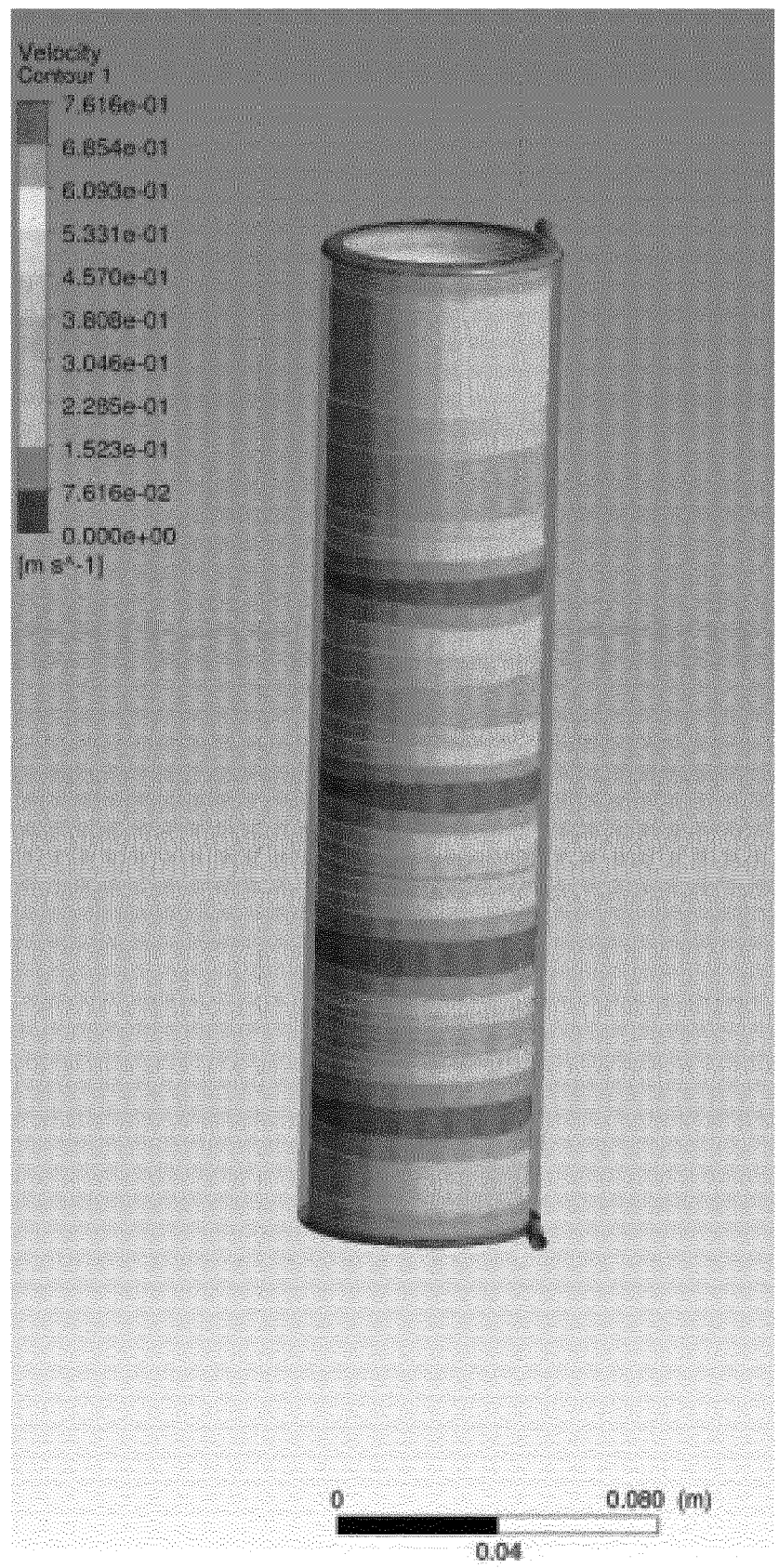
FIG. 5 displays the velocity contour of the reaction mixture in the Taylor-Couette reactor for the simulation of Example 2, wherein the scale in the figure indicates the velocity in m·$s^{-1}$, which ranges from 0 to 0.7616 m·$s^{-1}$. The scale at the bottom of the figure displays the dimensions of the reactor used for the simulation in meters.
Figure 6:
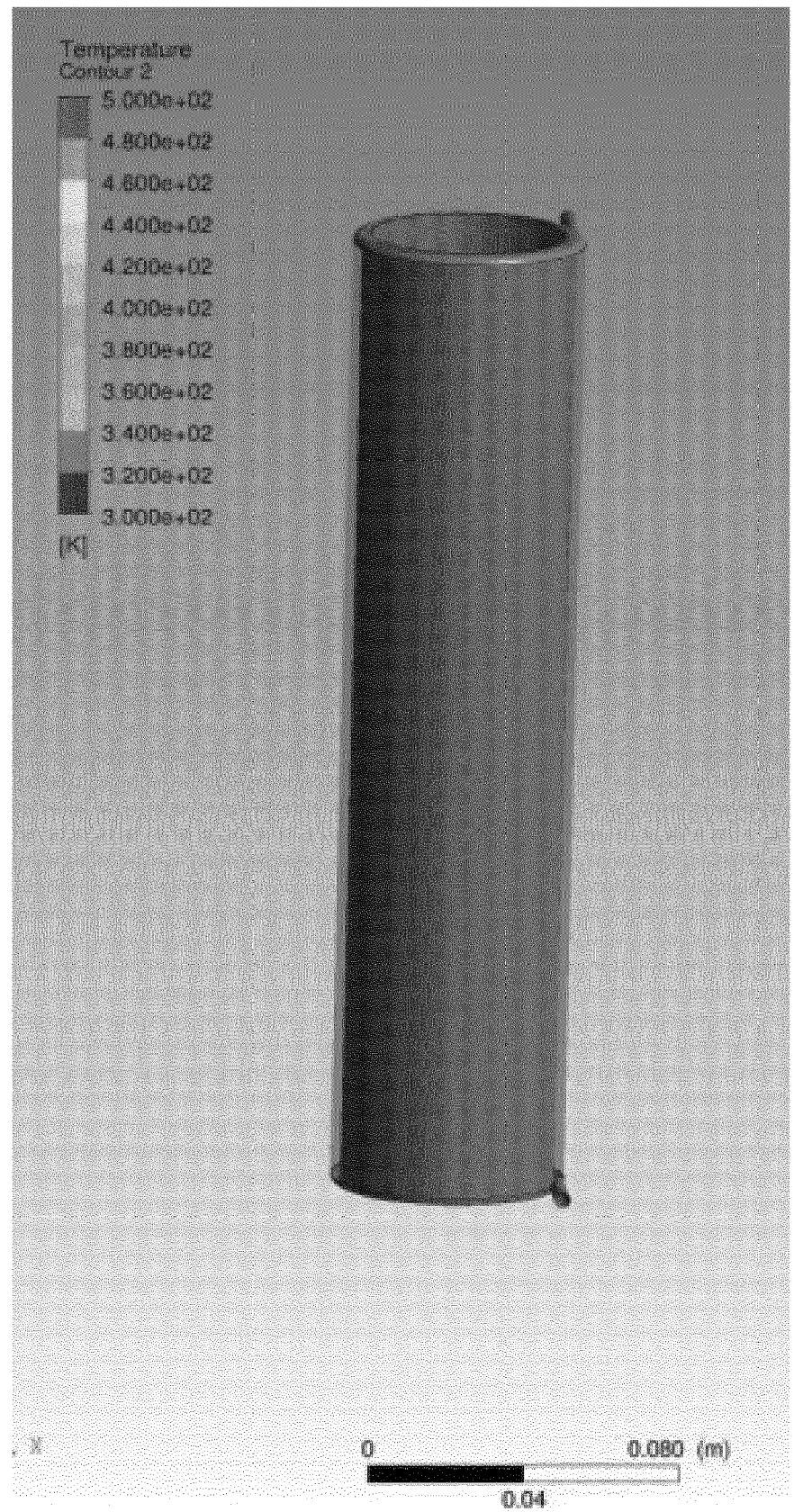

A further simulation was conducted with the reaction set-up described above, wherein the shear rate of the Taylor-Couette reactor was set such that the Reynolds number (Re) of the reaction mixture was Re=2.6, and the Taylor number (Ta) of the reaction mixture was Ta=111. The velocity contour obtained according to the simulation is displayed in FIG. 5, and the temperature contour is shown in FIG. 6. Thus, as may be taken from the results of the simulation displayed in FIG. 5, under the conditions chosen the reaction mixture displays an irregular velocity profile along the length of the reactor volume, wherein the velocity regularly oscillates between values of around 0.4 m·s$^{-1}$ and values of around 0.7 m·s$^{-1}$. As opposed to the results obtained in Example 1, said velocity contour is indicative of an at least intermittently if not substantially turbulent flow regime of the reaction mixture along the entire length of the reactor. Furthermore, as may be taken from the temperature contour displayed in FIG. 6, as opposed to the results obtained in Example 1, substantially no temperature gradient may be obtained under these simulation conditions, the temperature being around 500 K along the entire length of the reactor volume.

Figure 7:
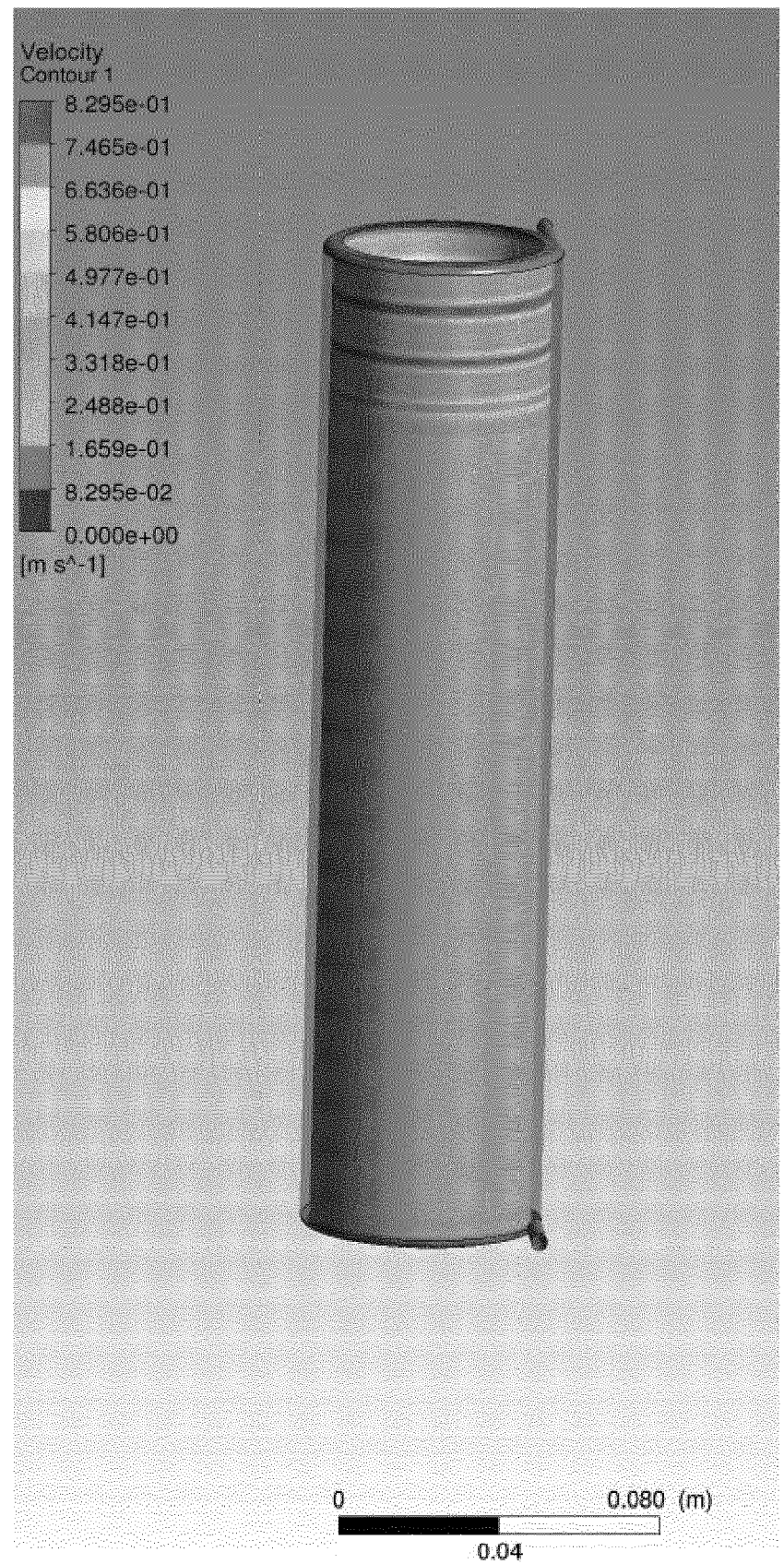
FIG. 7 displays the velocity contour of the reaction mixture in the Taylor-Couette reactor for the simulation of Example 3, wherein the scale in the figure indicates the velocity in m·$s^{-1}$, which ranges from 0 to 0.82965 m·$s^{-1}$. The scale at the bottom of the figure displays the dimensions of the reactor used for the simulation in meters.
Figure 8:
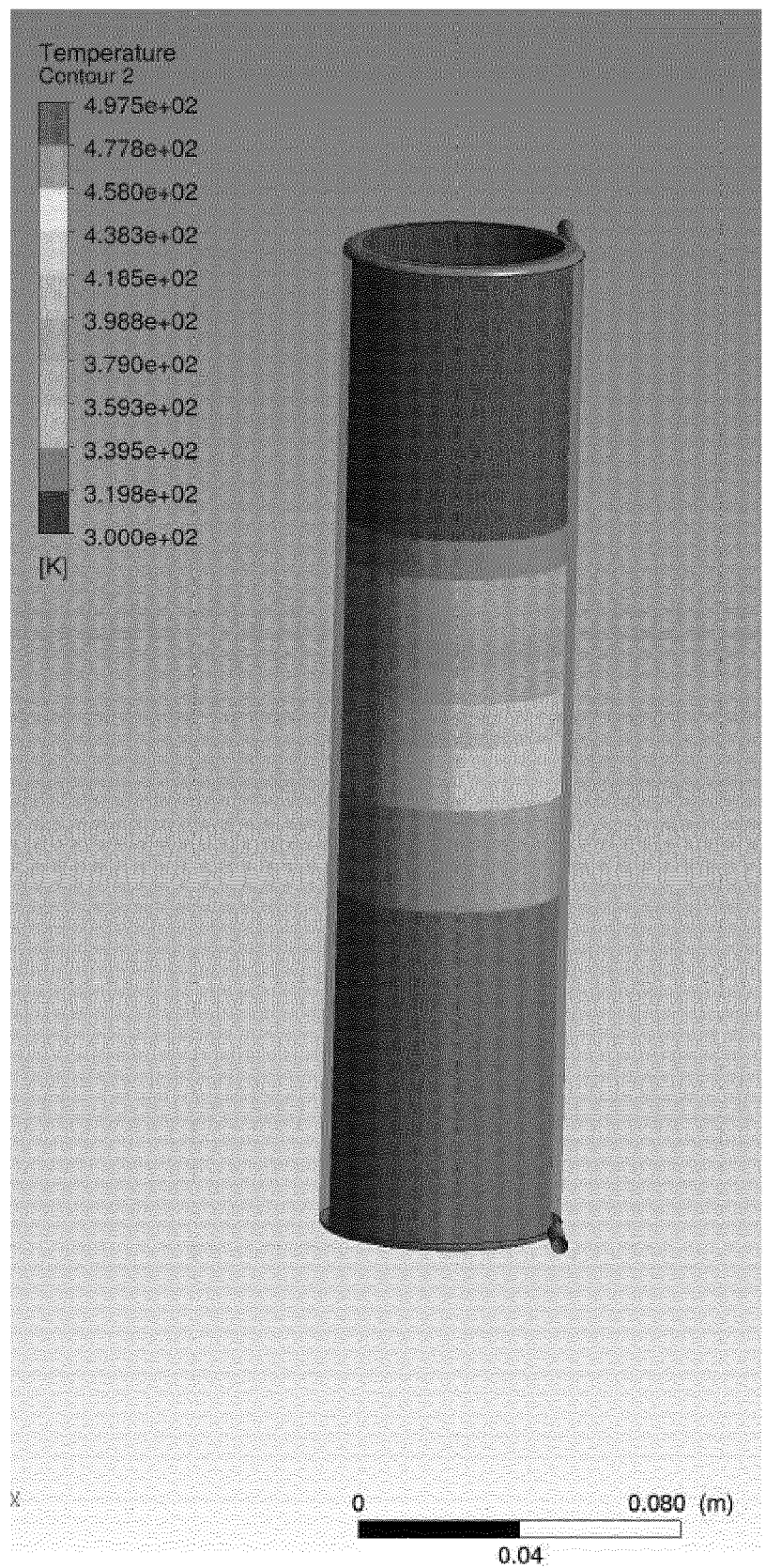

Example 3: Simulation of a Change of the Reaction Mixture from Aqueous Solution to Gel An additional simulation was conducted, wherein the rheology of the reaction mixture was varied to simulate a transition from the rheology of an aqueous solution to the rheology of a gel as is typically encountered during the course of crystallization of zeolitic materials from an aqueous solution or slurry containing the precursor compounds. In particular, the rheology was simulated such that in the first third of the reactor volume from the inlet end displayed a rheology typical of an aqueous solution, and the last two thirds of the reactor volume down to the outlet of the reactor display a rheology typical of a gel. For this purpose, no heating of the reaction mixture was applied in the first third of the reactor volume, heating only being applied to the last two thirds down to the outlet. Furthermore, the feed of the reaction mixture was increased to 60 ml/min, and the rotation speed Thus, as may be taken from the results of the simulation displayed in FIG. 7, under the conditions chosen the reaction mixture displays an irregular velocity profile along the first third of the reactor volume, wherein the velocity regularly oscillates between values of around 0.2 m·s$^{-1}$ and values of around 0.8 m·s$^{-1}$, thus indicative of an at least intermittently if not substantially turbulent flow regime. Said velocity contour however diminishes to become constant at values of around 0.45 m·s$^{-1}$, which is then observed throughout the remaining length of the reactor volume down to the outlet and is again indicative of a laminar flow regime within that portion of the reactor volume. Furthermore, as may be taken from the temperature contour displayed in FIG. 8, the first third of the reactor length is not heated and thus displays a temperature of 300 K, which is the temperature the reaction mixture has prior to entering the reactor. In the last two thirds of the reactor length in which the reaction mixture is heated, the second third displays a gradual increase to values of around 480 K, said temperature then being maintained in the last third of the reactor length down to the outlet. Thus, the reaction mixture in the last two thirds of the reactor volume displays a velocity and temperature contour resembling the results obtained in Example 1.

Figure 9:
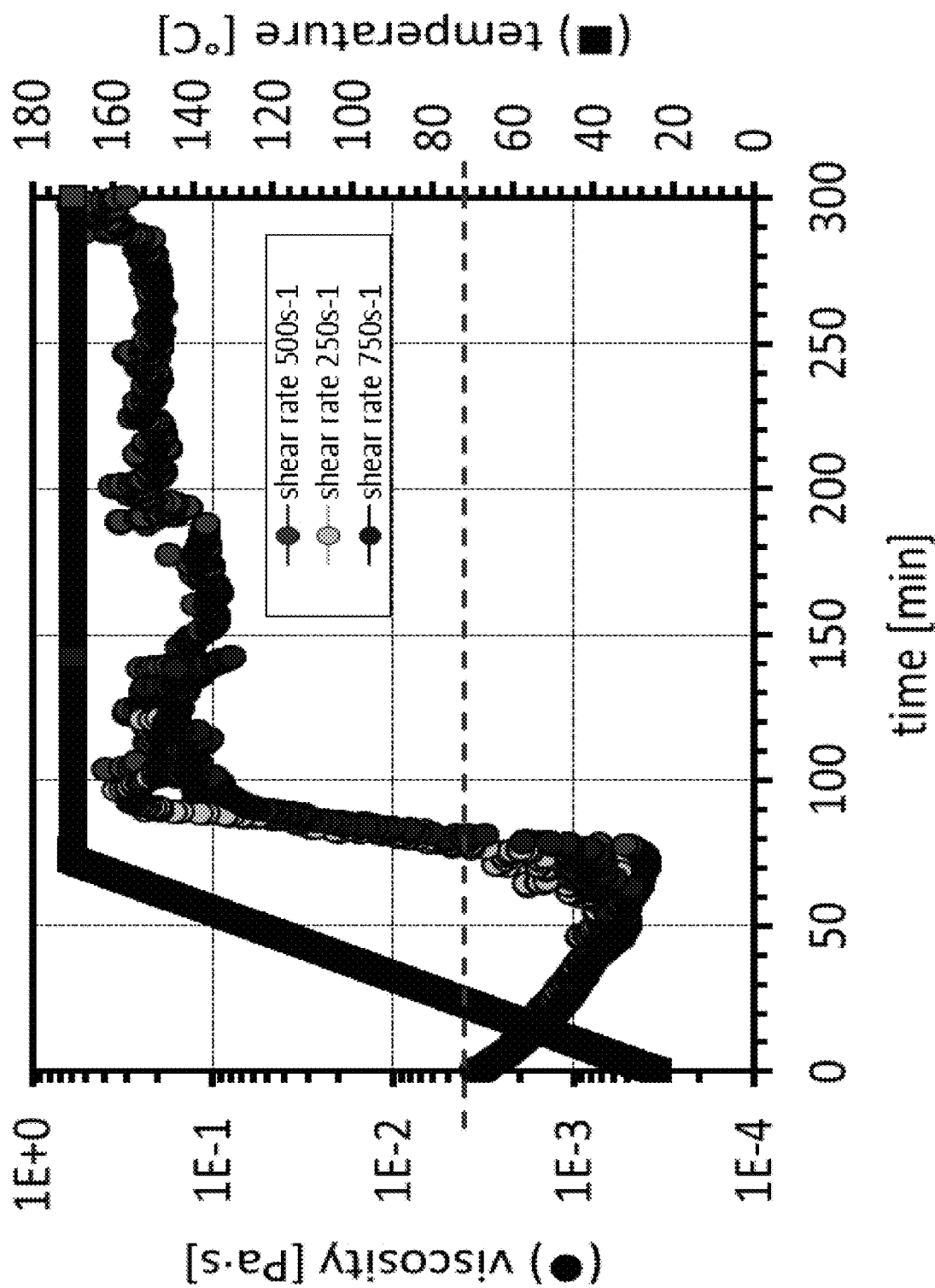
FIG. 9 displays the results of the viscosity measurements obtained in Reference Example 1 for different shear rates. In the figure, temperature measurement points are displayed with "■" and the viscosity measurement points with "●", wherein the temperature values in °C. are plotted along the right abscissa, and the viscosity values in Pa·s are plotted along the left abscissa. The duration of the viscosity measurement in minutes is plotted along the ordinate. In the legend, the different viscosity measurement points for shear rates of 250, 500, and 750 s$^{-1}$ are indicated, wherein the measurement for the shear rate of 250 s$^{-1}$ was interrupted after 119 minutes, and the measurement for the shear rate of 750 s$^{-1}$ was interrupted after 142 minutes. The dotted line in the figure indicates the viscosity level of the reaction mixture at the beginning of the measurement prior to heating.

Reference Example 1: Viscosity Measurements Performed on a Reaction Mixture for Producing Chabazite A reaction mixture for the synthesis of chabazite employing N,N,N-trimethylcyclohexylammonium hydroxide was prepared as described in WO 2013/182974 A1. The viscosity characteristics of said reaction mixture were then measured under reaction conditions, wherein the mixture was place in a rotational viscometer (Anton Paar, Physica MCR301) using a pressurized cell with cylindrical geometry (DG35, 12/PR). After placing a sample of the reaction mixture in the measurement cell, it was pressurized with nitrogen gas to a pressure of 8 bar. The viscosity was then measured, wherein the sample was heated from room temperature at a reaction rate of 2° C. per minute until 170° C. and then held constantly at that temperature. Three samples were measured at respective shear rates of 250 $s^{-1}$, 500 $s^{-1}$, and 750 $s^{-1}$, wherein the measurement for the shear rate of 250 $s^{-1}$ was interrupted after 119 minutes, the measurement for the shear rate of 750 $s^{-1}$ was interrupted after 142 minutes, and the shear rate of 500 $s^{-1}$ was interrupted after 300 minutes. The results of the measurement are displayed in FIG. 9. Thus, as may be taken from the results, the viscosity gradually decreases during the intial heating stage, wherein when reaching the maximum temperature it suddenly increases considerably, and then levels out until the end of the crystallization reaction, at which a further considerable increase of the viscosity is observed.

Accordingly, the viscosity measurement of the crystallization of the reaction mixture confirms the evolution of the rheology of the reaction mixture during the preparation of a zeolitic material as simulated in Example 3.

Cited Prior Art Literature:
US 2016/0115039 A1
Liu et al. in Angew. Chem. Int. Ed. 2015, 54, 5683-5687
Ju, J. et al. in Chemical Engineering Journal 2006, 116, 115-121
Vandermeersch, T. et al. in Microporous and Mesoporous Materials 2016, 226, 133-139
Liu, Z. et al. in Chemistry of Materials 2014, 26, 2327-2331
Slangen et al. "Continuous Synthesis of Zeolites using a Tubular Reactor", 12$^{th}$ International Zeolite Conference, Materials Research Society 1999
Bonaccorsi, L. et al. in Microporous and Mesoporous Materials 2008, 112, 481-493
US 2001/0054549 A1

What is claimed is:

1. A process for preparing a zeolitic material having a framework structure comprising $YO_2$ and comprising $X_2O_3$, wherein Y is Si or Si and Ti and wherein X is Al, said processing comprising:

(i) preparing a mixture comprising a source of $YO_2$, a source of $X_2O_3$, and a liquid solvent system, wherein a molar ratio of $YO_2:X_2O_3$ of the mixture prepared in (i) ranges from 1 to 1,000;
(ii) feeding the mixture prepared in (i) as a reaction mixture into a reactor;
(iii) heating the reaction mixture in the reactor, to obtain a reacted mixture comprising a zeolitic material having a framework structure comprising $YO_2$ and comprising $X_2O_3$; and
(iv) collecting the reacted mixture obtained in (iii) as an effluent from the reactor;
wherein the reactor is a Taylor-Couette reactor comprising an inner cylinder and an outer cylinder which are coaxially aligned, wherein the Taylor-Couette reactor has a rotor-stator set-up, with the outer cylinder as a stator, wherein a total volume of the reactor containing the reaction mixture is from 5 $cm^3$ to 1 $m^3$,
wherein the mixture prepared in (i) further comprises at least one source for $OH^-$, wherein said at least one source for $OH^-$ comprises a metal hydroxide,
wherein in (iii) the reaction mixture is heated to a temperature in the range of from about 100° C. to about 300° C.,
wherein in (iii) the reaction mixture is heated under autogenous pressure,
wherein in (iii) the flow regime in at least a portion (P) of the volume of the reactor is laminar, wherein the portion (P) is an uninterrupted portion of the volume of the reactor, and
wherein the uninterrupted portion (P) of the volume of the reactor constitutes 10% to 95% of the total volume of the reactor containing the reaction mixture.

2. The process of claim 1, wherein, in (iii), a Reynolds number (Re) in at least the portion (P) of the volume of the reactor is 2,500 or less.

3. The process of claim 2, wherein, in (iii), a Taylor number (Ta) in at least the portion (P) satisfies the following condition (III):

$$Ta \leq (1.52 \cdot Re) + n \qquad \text{(III)}$$

wherein $n \leq 102$.

4. The process of claim 1, wherein the process is conducted in a continuous mode and/or in a batch mode.

5. The process of claim 1, wherein the zeolitic material obtained in (iii) has a framework structure selected from the group consisting of BEA, CHA, FAU, FER, GME, LEV, MFI, MOR and MWW, including mixed structure of two or more thereof.

* * * * *